(12) United States Patent
Birmingham

(10) Patent No.: US 11,124,864 B2
(45) Date of Patent: Sep. 21, 2021

(54) METHOD OF FABRICATING NANO-STRUCTURES WITH ENGINEERED NANO-SCALE ELECTROSPRAY DEPOSITIONS

(71) Applicant: Birmingham Technologies, Inc., Arlington, VA (US)

(72) Inventor: Joseph G. Birmingham, Arlington, VA (US)

(73) Assignee: BIRMINGHAM TECHNOLOGIES, INC., Arlington, VA (US)

(*) Notice: Subject to any disclaimer, the term of this patent is extended or adjusted under 35 U.S.C. 154(b) by 86 days.

(21) Appl. No.: 16/416,869

(22) Filed: May 20, 2019

(65) Prior Publication Data

US 2020/0370158 A1 Nov. 26, 2020

(51) Int. Cl.

| | |
|---|---|
| C23C 4/06 | (2016.01) |
| C23C 4/123 | (2016.01) |
| C23C 4/10 | (2016.01) |
| B01J 13/02 | (2006.01) |
| C04B 35/622 | (2006.01) |
| C01B 32/956 | (2017.01) |

(52) U.S. Cl.
CPC ............ *C23C 4/06* (2013.01); *B01J 13/02* (2013.01); *C01B 32/956* (2017.08); *C04B 35/62222* (2013.01); *C23C 4/10* (2013.01); *C23C 4/123* (2016.01)

(58) Field of Classification Search
CPC .. C01B 32/956; B01J 13/02; C04B 35/62222; C23C 4/06; C23C 4/123; C23C 4/10; B33Y 10/00; B33Y 70/00
See application file for complete search history.

(56) References Cited

U.S. PATENT DOCUMENTS

| | | |
|---|---|---|
| 2,876,368 A | 3/1959 | Thomas |
| 4,264,641 A | 4/1981 | Mahoney et al. |
| 4,628,143 A | 12/1986 | Brotz |
| 4,762,975 A | 8/1988 | Mahoney et al. |

(Continued)

FOREIGN PATENT DOCUMENTS

| | | |
|---|---|---|
| JP | 2006086510 | 3/2006 |
| JP | 4901049 | 3/2012 |

(Continued)

OTHER PUBLICATIONS

Alhuwaidi, S.A., "3D Modeling Analysis, and Design of a Traveling-Wave Tube Using a Modified Ring-Bar Structure with Rectangular Transmission Lines Geometry," Dissertation submitted to the University of Colorado Colorado Springs (2017).

(Continued)

*Primary Examiner* — Michael P Wieczorek
(74) *Attorney, Agent, or Firm* — Lieberman & Brandsdorfer, LLC

(57) ABSTRACT

Embodiments relate to a method of manufacturing pinned nano-structures with tailored gradient properties. First and second compositions are provided. Each of the compositions includes a nano-structural material, a plurality of grain growth inhibitor nano-particles, and at least one of a tailoring solute and a plurality of tailoring nano-particles. Deposition layers are formed proximal to a substrate with each of the compositions through electrospray techniques.

38 Claims, 13 Drawing Sheets

(56) References Cited

U.S. PATENT DOCUMENTS

| | | |
|---|---|---|
| 4,900,368 A | 2/1990 | Brotz |
| 5,008,579 A | 4/1991 | Conley et al. |
| 5,578,886 A | 11/1996 | Holmlid et al. |
| 5,606,213 A | 2/1997 | Kherani et al. |
| 5,787,965 A | 8/1998 | Sterett et al. |
| 5,960,853 A | 10/1999 | Sterett et al. |
| 5,989,824 A | 11/1999 | Birmingham et al. |
| 5,994,638 A | 11/1999 | Edelson |
| 6,062,392 A | 5/2000 | Birmingham et al. |
| 6,110,247 A | 8/2000 | Birmingham et al. |
| 6,287,714 B1 | 9/2001 | Xiao et al. |
| 6,294,858 B1 | 9/2001 | King et al. |
| 6,492,792 B1 | 12/2002 | Johnson, Jr. et al. |
| 6,722,872 B1 | 4/2004 | Swanson et al. |
| 6,774,532 B1 | 8/2004 | Marshall et al. |
| 7,073,561 B1 | 7/2006 | Henn |
| 7,081,684 B2 | 7/2006 | Patel et al. |
| 7,259,109 B2 | 8/2007 | Meagley |
| 7,327,026 B2 | 2/2008 | Shimogishi et al. |
| 7,524,528 B2 | 4/2009 | Kodas et al. |
| 7,651,926 B2 | 1/2010 | Jacobson et al. |
| 7,701,576 B2 | 4/2010 | Moore et al. |
| 7,906,182 B1 | 3/2011 | Schlaf |
| 8,093,144 B2 | 1/2012 | Jacobson et al. |
| 8,182,982 B2 | 5/2012 | Kobrin |
| 8,192,920 B2 | 6/2012 | Kobrin |
| 8,318,386 B2 | 11/2012 | Kobrin |
| 8,334,217 B2 | 12/2012 | Kobrin |
| 8,367,525 B2 | 2/2013 | Jacobson et al. |
| 8,425,789 B2 | 4/2013 | Kobrin |
| 8,518,633 B2 | 8/2013 | Kobrin et al. |
| 8,621,245 B2 | 12/2013 | Shearer et al. |
| 8,816,633 B1 | 8/2014 | Neal et al. |
| 8,907,352 B2 | 12/2014 | Naito |
| 9,069,244 B2 | 6/2015 | Kobrin |
| 9,073,937 B2 | 7/2015 | Frazier et al. |
| 9,116,430 B2 | 8/2015 | Kobrin et al. |
| 9,166,405 B2 | 10/2015 | Brandt et al. |
| 9,244,356 B1 | 1/2016 | Kobrin et al. |
| 9,465,296 B2 | 10/2016 | Kobrin |
| 9,472,699 B2 | 10/2016 | Kotter |
| 9,481,112 B2 | 11/2016 | Kobrin et al. |
| 9,645,504 B2 | 5/2017 | Kobrin |
| 9,722,420 B2 | 8/2017 | Teggatz et al. |
| 9,726,790 B2 | 8/2017 | Boyd et al. |
| 9,726,791 B2 | 8/2017 | Boyd et al. |
| 9,782,917 B2 | 10/2017 | Kobrin et al. |
| 9,786,718 B1 | 10/2017 | Boyd |
| 9,793,317 B1 | 10/2017 | Boyd et al. |
| 9,893,261 B1 | 2/2018 | Boyd et al. |
| 9,923,514 B1 | 3/2018 | Boyd et al. |
| 9,981,410 B2 | 5/2018 | Kobrin et al. |
| 10,014,461 B1 | 7/2018 | Boyd et al. |
| 10,056,538 B1 | 8/2018 | Boyd |
| 10,079,561 B1 | 9/2018 | Boyd |
| 10,096,648 B2 | 10/2018 | Boyd |
| 10,103,654 B2 | 10/2018 | Yun et al. |
| 10,109,672 B2 | 10/2018 | Boyd et al. |
| 10,109,781 B1 | 10/2018 | Boyd |
| 10,110,163 B2 | 10/2018 | Boyd et al. |
| 10,247,861 B2 | 4/2019 | Boyd et al. |
| 10,249,810 B2 | 4/2019 | Boyd et al. |
| 10,345,491 B2 | 7/2019 | Boyd et al. |
| 10,345,492 B2 | 7/2019 | Boyd et al. |
| 10,347,777 B2 | 7/2019 | Boyd et al. |
| 10,525,684 B2 | 1/2020 | Boyd et al. |
| 10,529,871 B2 | 1/2020 | Boyd et al. |
| 10,546,991 B2 | 1/2020 | Boyd |
| 10,553,774 B2 | 2/2020 | Boyd |
| 10,690,485 B2 | 6/2020 | Koester et al. |
| 10,859,480 B2 | 12/2020 | Koester et al. |
| 10,985,677 B2 | 4/2021 | Boyd et al. |
| 2005/0016575 A1 | 1/2005 | Kumar et al. |
| 2005/0104185 A1 | 5/2005 | Shimogishi et al. |
| 2007/0182362 A1 | 8/2007 | Trainor et al. |
| 2010/0068406 A1 | 3/2010 | Man |
| 2010/0326487 A1 | 12/2010 | Komori et al. |
| 2011/0104546 A1 | 5/2011 | Seino et al. |
| 2011/0148248 A1 | 6/2011 | Landa |
| 2012/0153772 A1 | 6/2012 | Landa |
| 2013/0101729 A1 | 4/2013 | Keremes et al. |
| 2013/0313745 A1 | 11/2013 | Ikushima |
| 2015/0024516 A1 | 1/2015 | Seibel et al. |
| 2015/0087144 A1 | 3/2015 | Liu et al. |
| 2015/0229013 A1 | 8/2015 | Birmingham et al. |
| 2015/0251213 A1* | 9/2015 | Birmingham ............ B05D 1/06 427/475 |
| 2017/0106082 A1 | 4/2017 | Birmingham |
| 2017/0126150 A1 | 5/2017 | Wang |
| 2017/0155098 A1 | 6/2017 | Park et al. |
| 2017/0252807 A1 | 9/2017 | Lund et al. |
| 2017/0358432 A1 | 12/2017 | Wang |
| 2019/0214675 A1 | 7/2019 | Christensen et al. |
| 2019/0214845 A1 | 7/2019 | Hausman, Jr. et al. |
| 2019/0267846 A1 | 8/2019 | Shearer et al. |
| 2020/0274046 A1 | 8/2020 | Birmingham |

FOREIGN PATENT DOCUMENTS

| | | |
|---|---|---|
| JP | 6147901 | 6/2017 |
| JP | 6411612 | 10/2018 |
| JP | 6411613 | 10/2018 |
| JP | 6521400 | 5/2019 |
| JP | 6521401 | 5/2019 |
| JP | 6524567 | 6/2019 |
| JP | 6598339 | 10/2020 |
| KR | 20180107194 | 10/2018 |
| WO | 2009004345 | 1/2009 |
| WO | 2014186783 | 11/2014 |
| WO | 2017214179 | 12/2017 |
| WO | 2020184234 | 9/2020 |
| WO | 2020184235 | 9/2020 |

OTHER PUBLICATIONS

Birmingham, J.G., "DEP-Enhanced Micro-Injector Array for Liquid Fuel Atomizer," Final Report for U.S. Army SBIR 02.2 N02-148 (2001).

Birmingham, J.G., "E-Field Micro-Injector Array Liquid Fuel Atomizer," Final Report for NASA SBIR Phase I: NASA 01.1-A8.02 (2002).

Brodie, I. et al., "Impregnated Barium Dispenser Cathodes Containing Strontium or Calcium Oxide," Journal of Applied Physics, vol. 27, pp. 417-418 (1956).

Brodie, I. et al., "Secondary electron emission from barium dispenser cathodes," British Journal of Applied Physics, vol. 8, pp. 202-204 (1957).

Chou, S.H. et al.,"An orbital-overlap model for minimal work functions of cesiated metal surfaces," Journal of Physics: Condensed Matter, vol. 24, p. 445007 (2012).

Committee on Thermionic Research and Technology et al., "Thermionics: Quo Vadis? An Assessment of the DTRA's Advanced Thermionics Research and Development Program," National Academy Press (2001).

Datta, S., "Electronic Transport in Mesoscopic Systems," Cambridge University Press, New York, pp. 246-275 (1995).

Fall, C.J. et al., "Deriving accurate work functions from thin-slab calculations," Journal of Physics: Condensed Matter, vol. 11 2689-2696 (1999).

Fall, C.J. et al., "Theoretical maps of work-function anisotropies," Physical Review B, vol. 65, p. 045401 (2001).

Fomenko, V.S., "Handbook of Thermionic Properties, Electronic Work Functions and Richardson Constants of Elements and Compounds," Plenum Press Data Division, New York, pp. 126-137 (1966).

Giordano, L. et al., "Tuning the surface metal work function by deposition of ultrathin oxide films: Density functional calculations," Physical Review B, vol. 73, p. 045414 (2005).

Gyftopoulos, E.P. et al, "Work Function Variation of Metals Coated by Metallic Films," Journal of Applied Physics, vol. 33, pp. 6-737 (1962).

(56) References Cited

OTHER PUBLICATIONS

Haas, G.A. et al., "Interatomic Auger Analysis of the Oxidation of Thin Ba Films," Applications of Surface Science, vol. 16, pp. 139-162 (1983).
Hafner, J. et al., "Toward Computational Materials Design: The Impact of Density Functional Theory on Materials Research," MRS Bulletin, vol. 31, pp. 659-668 (2006).
Hatsopoulos, G.N. et al., "Thermionic Energy Conversion vol. I: Process and Devices," The MIT Press, Cambridge, MA, pp. 5-37 (1973).
Houston, J.M., "Theoretical Efficiency of the Thermionic Energy Converter," Journal of Applied Physics, vol. 30, pp. 481-487 (1959).
Incropera, F.P. et al., "Fundamentals of Heat and Mass Transfer, 6th Edition," John Wiley & Sons, pp. 2-42 (2007).
Jensen, K.L. et al., "A photoemission model for low work function coated metal surfaces and its experimental validation," Journal of Applied Physics, vol. 99, p. 124905 (2006).
Kawano, H., "Effective work functions for ionic and electronic emissions from mono- and polycrystalline surfaces," Progress in Surface Science, vol. 83, pp. 1-165 (2008).
Lee, J.-H. et al, "Thermionic Emission From Microfabricated Silicon-Carbide Filaments," Proceedings Power MEMS, pp. 149-152 (2009).
Lenggoro, I.W. et al., "Nanoparticle Assembly on Patterned "plus/minus" Surfaces From Electrospray of Colloidal Dispersion," Journal of Colloid and Interface Science, vol. 303, pp. 124-130 (2006).
Levine, J.D., "Structural and Electronic Model of Negative Electron Affinity on the Si/Cs/O Surface," Surface Science, vol. 34, pp. 90-107 (1973).
Lin, M.C. et al., "Work functions of cathode surfaces with adsorbed atoms based on ab initio calculations," Journal of Vacuum Science and Technology B, vol. 26, pp. 821-825 (2008).
Lindell, L. et al., "Transparent, Plastic, Low-Work-Function Poly (3,4-ethylenedioxythiophene) Electrodes," Chemistry of Materials, vol. 18, pp. 4246-4252 (2006).
Love, J.C. et al., "Self-Assembled Monolayers of Thiolates on Metals as a Form of Nanotechnology," Chemical Reviews, vol. 105, pp. 1103-1169 (2005).
Maboudian, R. et al., "Critical Review: Adhesion in surface micromechanical structures," Journal of Vacuum Science and Technology B, vol. 15, pp. 1-20 (1997).
Maboudian, R. et al., "Self-assembled monolayers as anti-stiction coatings for MEMS: characteristics and recent developments," Sensors and Actuators, vol. 82, pp. 219-223 (2000).
Maboudian, R., "Surface processes in MEMS technology," Surface Science Reports, vol. 30, 207-269 (1998).
Magkoev, T.T. et al., "Aluminium oxide ultrathin-film growth on the Mo(110) surface: a work-function strudy," Journal of Physics: Condensed Matter, vol. 13, pp. L655-L661 (2001).
Modinos, A., "Theory of Thermionic Emission," Surface Science, vol. 115, pp. 469-500 (1982).
Morris, J.E., "Nanopackaging: Nanotechnologies and Electronics Packaging," Springer-Verlag, pp. 93-107 (2008).
Musho, T.D. et al., "Quantum simulation of thermionic emission from diamond films," Journal of Vacuum Science and Technology B, vol. 31, p. 021401 (2013).
Natan, A. et al., "Computing surface dipoles and potentials of self-assembled monolayers from first principles," Applied Surface Science, vol. 252, pp. 7608-7613 (2006).
Neugebauer, J. et al., "Adsorbate-substrate and adsorbate-adsorbate interactions of Na and K adlayers on Al (111)," Physical Review B, vol. 46, pp. 16067-16080 (1992).
Nichols, M.H., "The Thermionic Constants of Tungsten as a Function of Crystallographic Direction," Physical Review, vol. 57, pp. 297-306 (1940).
Prada, S. et al., "Work function changes induced by deposition of ultrathin dielectric films on metals: A theoretical analysis," Physical Review B, vol. 78, p. 235423 (2008).

Schwede, J.W. et al., "Photon-enhanced thermionic emission for solar concentrator systems," Nature Materials, vol. 9, p. 762-767 (2010).
Singh-Miller, N.E. et al., "Surface energies, work functions, and surface relaxations of low-index metallic surfaces from first principles," Physical Review B, vol. 80, p. 235407 (2009).
Vlahos, V. et al., "Ab initio investigation of barium-scandium-oxygen coatings on tungsten for electron emitting cathodes," Physical Review B, vol. 81, p. 054207 (2010).
Wang, C.S., "High photoemission efficiency of submonolayer cesium-covered surfaces," Journal of Applied Physics, vol. 48, pp. 1477-1479 (1977).
Wooten, L.A. et al., "Evaporation of Barium and Strontium from Oxide-Coated Cathodes," Journal of Applied Physics, vol. 26, pp. 44-51 (1955).
Zhao, Y.P., "Morphological stability of epitaxial thin elastic films by van der Waals force," Archive of Applied Mechanics, vol. 72, pp. 77-84 (2002).
International Search Report for PCT/US2020/033528, dated Aug. 2020.
Birmingham, Joseph, "Printed Self-Powered Miniature Air Sampling Sensors", Sensors and Transducers, vol. 214, pp. 1-11 (2017).
International Search Report for PCT/US2020/019230, dated Jun. 2020.
International Search Report for PCT/US2020/019232, dated Jun. 2020.
Murata, Kazuhiro, "Super-tine ink-jet printing for nanotechnology", Proceedings International Conference on MEMS, NANO and Smart Systems, pp. 346-349 (2003).
Office Action for U.S. Appl. No. 16/284,967, dated Jul. 2020.
Park, Jang-Ung et al., "High-resolution electrohydrodynamic jet printing", Nature Materials, vol. 6, pp. 782-789 (2007).
Park, Jang-Ung et al., "Nanoscale Patterns of Oligonucleotides Formed by Electrohydrodynamic Jet Printing with Applications in Biosensing and Nanomaterials Assembly", Nano Letters, vol. 8, pp. 4210-4216 (2008).
Schneider, Julian, "Electrohydrodynamic nanoprinting and its applications", Diss. ETH No. 22694 (2015).
Bell, Lon E., "Cooling, heating, generating power, and recovering waste heat with thermoelectric systems," Science, vol. 321, pp. 1457-1461 (2008).
Bhadrachalam, Pradeep et al., "Energy-filtered cold electron transport at room temperature," Nature Communications, Sep. 10, 2014.
Brezonik, Patrick L. et al., "Water Chemistry: An Introduction to the Chemistry of Natural and Engineered Aquatic Systems," Oxford University Press, Inc., pp. 170-175 (2011).
Chung, M.S. et al., "Energy exchange processes in electron emission at high fields and temperatures," Journal of Vacuum Science and Technology B, vol. 12, pp. 727-736 (1994).
Cronin, J.L., "Modern dispenser cathodes," IEE Proc., vol. 128, Pt. 1, No. 1, pp. 19-32 (1981).
Curzon, F.L. et al., "Efficiency of a Carnot engine at maximum power output," American Journal of Physics, vol. 43, pp. 22-24 (1975).
Cutler, P.H. et al., "A new model for the replacement process in electron emission at high fields and temperatures," Applied Surface Science, vol. 76-77, pp. 1-6 (1994).
Daniel, Marie-Christine et al., "Gold Nanoparticles: Assembly, Supramolecular Chemistry, Quantum-Size-Related Properties, and Applications toward Biology, Catalysis, and Nanotechnology," Chemical Reviews, vol. 104, No. 1, pp. 293-346 (2004).
Deng et al., "Digital electrospray for controlled deposition," Review of Scientific Instruments, vol. 81, pp. 035114-1-035114-6 (2010).
Deng, Weiwei et al., "Influence of space charge on the scale-up of multiplexed electrosprays," Aerosol Science 38, pp. 1062-1078 (2007).
Dillner, U., "The effect of thermotunneling on the thermoelectric figure of merit," Energy Conversion and Management, vol. 49, No. 12, pp. 3409-3425 (2008).
Fisher, T.S. et al., "Thermal and Electrical Energy Transport and Conversion in Nanoscale Electron Field Emission Processes," Journal of Heat Transfer, vol. 124, pp. 954-962 (2002).

(56) References Cited

OTHER PUBLICATIONS

Fu, Xinyong et al., "Realization of Maxwell's Hypothesis," Shanghai Jiao Tong University (2008).
Hishinuma, Y. et al., "Refrigeration by combined tunneling and thermionic emission in vacuum: use of nanometer scale design," Applied Physics Letters, vol. 78, No. 17, pp. 2572-2574 (2001).
Hishinuma, Yoshikazu et al., "Measurements of cooling by room-temperature thermionic emission across a nanometer gap," Journal of Applied Physics, vol. 94, No. 7, p. 4690 (2003).
Ioffe, A.F., "Semiconductor Thermoelements and Thermoelectric Cooling Infosearch," Infosearch Ltd., 1957.
Klimeck et al., "Quantum device simulation with a generalized tunneling formula," Appl. Phys. Lett., vol. 67, pp. 2539-2541 (1995).
Koeck, Franz A.M. et al., "Thermionic electron emission from low work-function phosphorus doped diamond films," Diamond Related Material, vol. 18, pp. 789-791 (2009).
Landauer, R., "Spatial Variation of Currents and Fields Due to Localized Scatterers in Metallic Conduction," IBM Journal of Research and Development, vol. 1, pp. 223-231 (1957).
Likharev, Konstantin K., "Single-Electron Devices and Their Applications," Proc. IEEE, vol. 87, pp. 606-632 (1999).
Mahan, G.D., "Thermionic refrigeration," Journal of Applied Physics, vol. 76, No. 7, pp. 4362-4366 (1994).
Marzari, Nicola et al., "Maximally localized generalized Wannier functions for composite energy bands," Physical Review B, vol. 56, No. 20, pp. 12847-12865 (1997).
Muller-Steinhagen, Hans et al., "Concentrating solar power," Ingenia, pp. 1-9 (2004).
Murray, Royce W., "Nanoelectrochemistry: Metal Nanoparticles, Nanoelectrodes, and Nanopores," Chemical Reviews, vol. 108, No. 7, pp. 2688-2720 (2008).
Nguyen, Hoang M. et al., "Thermionic emission via a nanofluid for direct electrification from low-grade heat energy," Nano Energy, vol. 49, pp. 172-178 (2018).
Obraztsov, Alexander et al., "Cold and Laser Stimulated Electron Emission from Nanocarbons," Journal Nanoelectronics and Optoelectronics, vol. 4, pp. 1-13 (2009).
Redko, Mikhail et al., "Design and Synthesis of a Thermally Stable Organic Electride," J. Am. Chem. Soc., vol. 127, No. 35, pp. 12416-12422 (2005).
Rusu, Paul et al., "Work functions of self-assembled monolayers on metal surfaces by first-principles calculations," Physical Review B, vol. 74, pp. 073414-1-073414-4 (2006).
Scheible, Dominik V. et al., "Tunable coupled nanomechanical resonators for single-electron transport," New Journal of Physics, vol. 4, pp. 86.1-86.7 (2002).
Schreiber, Frank, "Structure and growth of self-assembling monolayers," Progress in Surface Science, vol. 65, pp. 151-256 (2000).
Shakouri, Ali, "Nanoscale Thermal Transport and Microrefrigerators on a Chip," Proceedings of the IEEE, vol. 94, No. 8, pp. 1613-1638 (2006).
Shockley, William et al., "Detailed Balance Limit of Efficiency of pn Junction Solar Cells," Journal of Applied Physics, vol. 32, pp. 510-519 (1961).
Snider, D.R. et al., "Variational calculation of the work function for small metal spheres," Solid State communications, vol. 47, No. 10, pp. 845-849 (1983).
Snyder, G. et al., "Complex thermoelectric materials," Nature Materials, vol. 7, pp. 105-114 (2008).
Sodha, M.S. et al., "Dependence of Fermi energy on size," Journal of Physics D: Applied Physics, vol. 3, No. 2, pp. 139-144 (1970).
Stephanos, Cyril, "Thermoelectronic Power Generation from Solar Radiation and Heat," University of Augsburg, Ph.D. Thesis, Nov. 2012.
Templeton, Allen C. et al., "Monolayer-Protected Cluster Molecules," Accounts of Chemical Research, vol. 33, No. 1, pp. 27-36 (2000).

Tepper, Gary et al., "An electrospray-based, ozone-free air purification technology," Journal of Applied Physics, vol. 102, pp. 113305-1-113305-6 (2007).
Thygesen, Kristian S. et al., "Partly occupied Wannier functions," Physical Review Letters, vol. 94, pp. 026405-1-026405-4 (2005).
Ulrich, Marc D. et al., "Comparison of solid-state thermionic refrigeration with thermoelectric refrigeration," Journal of Applied Physics, vol. 90, No. 3, pp. 1625-1631 (2001).
Wada, Motoi et al., "Effective Work Function of an Oxide Cathode in Plasma," J. Plasma Fusion Res. Series, vol. 8, pp. 1366-1369 (2009).
Watanabe, Satoru et al., "Secondary electron emission and glow discharge properties of 12CaO—7Al2O3 electride or fluorescent lamp applications," Science and Technology of Advanced Materials, vol. 12, pp. 1-8 (2011).
Weaver, Stan et al., "Thermotunneling Based Cooling Systems for High Efficiency Buildings," GE Global Research, DOE Project: DE-FC26-04NT42324 (2007).
Weiss, C. et al., "Accuracy of a mechanical single-electron shuttle," Europhysics Letters, vol. 47, No. 1, p. 97 (1999).
Yamamoto, Shigehiko, "Fundamental physics of vacuum electron sources," Reports on Progress in Physics, vol. 69, pp. 181-232 (2006).
Zharin, Anatoly L. et al., "Application of the contact potential difference technique for on-line rubbing surface monitoring (review)," Tribology Letters, vol. 4, pp. 205-213 (1998).
Zhu, Moxuan, "Experimental Measurements of Thermoelectric Phenomena in Nanoparticle Liquid Suspensions (Nanofluids)," Graduate Thesis, Arizona State University, Dec. 2010.
Prieto Rojas, J. et al., "Folding and Stretching a Thermoelectric Generator," Proceedings of the Society of Photo-Optical Instrumentation Engineers, vol. 10639, p. 10639E (2018).
International Search Report for PCT/US2020/052506, dated Dec. 2020.
International Search Report for PCT/US2020/052507, dated Dec. 2020.
International Search Report for PCT/US2020/052508, dated Dec. 2020.
Battezzati, L. et al., "Solid state reactions in Al/Ni alternate foils induced by cold rolling and annealing," Acta Materialia, vol. 47, Issue 6, pp. 1901-1914 (1999).
Dinda, G.P. et al., "Synthesis of bulk nanostructured Ni, Ti and Zr by repeated cold-rolling," Scripta Materialia, vol. 52, Issue 7, pp. 577-582 (2005).
Fernandez De La Mora, J. et al., "Generation of submicron monodisperse aerosols by electrosprays," Journal of Aerosol Science, vol. 21, Suppl. 1, pp. s673-s676 (1990).
Gertsman, V. Y. et al., "Deformation behavior of ultrafine-grained materials," Materials Science Forum, vols. 225-227, pp. 739-744 (1996).
Jaworek, A., "Electrospray droplet sources for thin film deposition," Journal of Materials Science, vol. 42, Issue 1, pp. 266-297 (2007).
Koch, C.C., "Synthesis of nanostructured materials by mechanical milling: problems and opportunities," Nanostructured Materials, vol. 9, Issues 1-8, pp. 13-22 (1997).
Koch, C.C. et al., "Stabilization of nanocrystalline grain sizes by solute additions," Journal of Materials Science, vol. 43, Issue 23-24, pp. 7264-7272 (2008).
Lee, Z. et al., "Bimodal microstructure and deformation of cryomilled bulk nanocrystalline Al—7.5Mg alloy," Materials Science and Engineering A, vols. 410-411, pp. 462-467 (2005).
Lloyd, D.J., "Particle reinforced aluminum and magnesium matrix composites," International Materials Reviews, vol. 39, Issue 1, pp. 1-23 (1994).
Mayr, S.G. et al., "Stabilization of Cu nanostructures by grain boundary doping with Bi: Experiment versus molecular lynamics simulation," Physical Review B, vol. 76, p. 024111 (2007).
McCandlish L.E. et al., "Chemical processing of nanophase WC—Co composite powders," Materials Science and Technology, vol. 6, Issue 10, pp. 953-957 (1990).
Mortensen, A. et al., "Metal Matrix Composites," Annual Review of Materials Research, vol. 40, pp. 243-270 (2010).

(56) References Cited

OTHER PUBLICATIONS

Nabarro, F.R.N., "The theory of solution hardening," The Philosophical Magazine: A Journal of Theoretical Experimental and Applied Physics, vol. 35, pp. 613-622 (1977).
Valiev, R. Z. et al., "Bulk nanostructured materials from severe plastic deformation," Progress in Materials Science, vol. 45, pp. 103-189 (2000).
Valiev, R.Z. et al., "Producing Bulk Ultrafine-Grained Materials by Severe Plastic Deformation," Journal of Materials, vol. 58, Issue 4, p. 33 (2006).
Xiao, T.D. et al., "Synthesis of Si(N,C) nanostructured powders from an organometallic aerosol using a hot-wall reactor," Journal of Materials Science, vol. 28, pp. 1334-1340 (1993).
Go, David B. et al., "Thermionic Energy Conversion in the Twenty-first Century: Advances and Opportunities for Space and Terrestrial Applications," Frontiers in Mechanical Engineering, vol. 3 (2017).
List of Birmingham Technologies, Inc. Patents or Applications Treated as Related, May 2020.
Office Action for U.S. Appl. No. 16/284,979, dated Sep. 2020.
Office Action for U.S. Appl. No. 16/416,849, dated Nov. 2020.
Baram, M. et al., "Nanometer-Thick Equilibrium Films: The Interface Between Thermodynamics and Atomistics," Science, vol. 332, Issue 6026, pp. 206-209 (2011).
Bassani, J.L., "Incompatibility and a simple gradient theory of plasticity," Journal of Mechanics and Physics of Solids vol. 49, pp. 1983-1996 (2001).
Darling, K.A. et al., "Thermal stability of nanocrystalline Fe—Zr alloys," Materials Science and Engineering A, vol. 527, pp. 3572-3580 (2010).
De Juan, L. et al., "Charge and Size Distributions of Electrospray Drops," Journal of Colloid Interface Science, vol. 186, pp. 280-293 (1997).
Detor, Andrew J. et al., "Grain boundary segregation, chemical ordering and stability of nanocrystalline alloys: Atomistic computer simulations in the Ni—W system," Acta Materialia, vol. 55, pp. 4221-4232 (2007).
Gudmundson, Peter, "A unified treatment of strain gradient plasticity," Journal of the Mechanics and Physics of Solids, vol. 52, pp. 1379-1406 (2004).
Hentschel, T. et al., "Nanocrytsalline Ni-3.6 at.& P and its Transformation Sequence Studied by Atom-Probe Field-Ion Microscopy," Acta Materialia, vol. 48, pp. 933-941 (2000).
Kirchheim, Reiner, "Grain coarsening inhibited by solute segregation," Acta Materialia, vol. 50, pp. 413-419 (2002).
Kirchheim, Reiner, "Reducing grain boundary, dislocation line and vacancy formation energies by solute segregation. I. Theoretical backround," Acta Materialia, vol. 55, pp. 5129-5138 (2007).
Kirchheim, Reiner, "Reducing grain boundary, dislocation line and vacancy formation energies by solute segregation II. Experimental evidence and consequences," Acta Materialia, vol. 55, pp. 5139-5148 (2007).
Koch, C.C. et al., "Ductility of Nanostructured Materials," Materials Research Society Bulletin, vol. 24, pp. 54-58 (1999).
Legros, M. et al., "Microsample tensile testing of nanocrystalline metals," Philosophical Magazine A, vol. 80, No. 4, pp. 1017-1026 (2000).
Luo, Jian et al., "The Role of a Bilayer Interfacial Phase on Liquid Metal Embrittlement," Science, vol. 333, Issue 5050, pp. 1730-1733 (2011).
Millett, Paul C. et al., "Stabilizing nanocrystalline materials with dopants," Acta Materialia, vol. 55, pp. 2329-2336 (2007).
Moon, Kyoung II et al., "A study of the microstructure of nanocrystalline Al—Ti alloys synthesized by ball milling in a hydrogen atmosphere and hot extrusion," Journal of Alloys Compounds, vol. 291, pp. 312-321 (1999).
Nan, C.W. et al., "The Influence of Particle Size and Particle Fracture on the Elastic/Plastic Deformation of Metal Matrix Composites," Acta Materialia, vol. 44, No. 9, pp. 3801-3811 (1996).
Perepezko, J.H., et al., "Amorphization and nanostructure synthesis in Al alloys", Intermetallics 10 (2002) p. 1079-1088.
Sanders, P.G. et al., "The strength of nanocrystalline metals with and without flaws," Materials Science Engineering A, vol. 234-236, pp. 77-82 (1997).
Sanders, P.G. et al., "Elastic and Tensile Behavior of Nanocrystalline Copper and Palladium," Acta Materialia, vol. 15, No. 10, pp. 4019-4025 (1997).
Scoville, N. et al., "Thermal Conductivity Reductions in SiGe Via Addition of Nanophase Particles," Materials Research Society Symposium Proceedings, vol. 351, pp. 431-436 (1994).
Sekine, H. et al., "A combined microstructure strengthening analysis of SiC-p/Al metal matrix composites," Composites, vol. 26, pp. 183-188 (1995).
Taylor, Geoffrey, "Disintegration of water drops in an electric field," Proceedings of the Royal Society A, vol. 280, pp. 383-397 (1964).
Tsuji, N. et al., "Strength and ductility of ultrafine grained aluminum and iron produced by ARB and annealing," Scripta Materialia, vol. 47, pp. 893-899 (2002).
Valiev, R.Z. et al., "Paradox of strength and ductility in metals processed by severe plastic deformation," Journal of Materials Research, vol. 17, No. 1, pp. 5-8 (2002).
Vanherpe, L. et al., "Pinning effect of spheroid second-phase particles on grain growth studied by three-dimensional phase-field simulations", Computational Materials Science 49 (2010) 340-350.
Wang, Y. et al.,"High tensile ductility in a nanostructured metal", Nature, 419 (2002), 912-915.
Wang, Y. M. et al., "Enhanced tensile ductility and toughness in nanostructured Cu," Applied Physics Letters, vol. 80, pp. 2395-2397 (2002).
Weertman, J.R. et al., "Structure and Mechanical Behavior of Bulk Nanocrystalline Materials," Materials Research Society Bulletin, vol. 24, pp. 44-50 (1999).
Weissmuller, J., "Alloy Effects in Nanostructures" Nanostructured Materials, vol. 3, pp. 261-272 (1993).
Xiao, T.D. et al., "Synthesis of Nanostructured Ni/Cr and Ni—Cr3C2 Powders by an Organic Solution Reaction Method," Nanostructured Materials, vol. 7, No. 8, pp. 857-871 (1996).
Yamasaki, T. et al., "Formation of metal-TiN/TiC nanocomposite powders by mechanical alloying and their consolidation," Materials Science and Engineering A, vol. 350, pp. 168-172 (2003).

* cited by examiner

METHOD OF FABRICATING NANO-STRUCTURES WITH ENGINEERED NANO-SCALE ELECTROSPRAY DEPOSITIONS

BACKGROUND

The present embodiments relate to a method for using electrospray techniques to directly synthesize nano-structured materials. More specifically, the embodiments disclosed herein relate to methods of implementing electrospraying techniques to fabricate nano-structures with tailored, unique properties.

Various techniques for fabricating objects through three-dimensional (3D) printing include additive manufacturing techniques, such as inkjet printing, fused filament fabrication (FFF), and electron beam additive manufacturing (EBAM). Many known inkjet devices demonstrate insufficient deposition control and accuracy through formation of satellite droplets. The FFF process is limited with respect to material selection. Accordingly, these examples of additive manufacturing techniques are best suited for macroscopic object fabrication due to the scale of material depositions, such as millimeter (mm) for FFF and EBAM manufacturing, and microns for inkjet printing.

SUMMARY

A method is provided to form nano-structures with tailored properties on objects while fabricating the objects.

In one aspect, a method of manufacturing a pinned nano-structure with one or more tailored gradient properties is provided. The method includes providing first and second compositions. The first composition includes a first nano-structural material and a plurality of first grain growth inhibitor nano-particles including one or more first grain growth inhibitors. The first composition also includes at least one of a first tailoring solute and a plurality of first tailoring nano-particles. The first tailoring solute includes one or more first tailoring solute materials. The first tailoring nano-particles include one or more first tailoring nano-particle materials. The second composition includes a second nano-structural material and a plurality of second grain growth inhibitor nano-particles including one or more second grain growth inhibitors. The second composition also includes at least one of a second tailoring solute and a plurality of second tailoring nano-particles. The second tailoring solute includes one or more second tailoring solute materials. The second tailoring nano-particles include one or more second tailoring nano-particle materials. First and second deposition layers are formed proximal to a substrate with the first and second compositions, respectively.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments, unless otherwise explicitly indicated.

DETAILED DESCRIPTION

It will be readily understood that the components of the present embodiments, as generally described and illustrated in the Figures herein, may be arranged and designed in a wide variety of different configurations. Thus, the following detailed description of the embodiments of the apparatus, system, and method of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Construction of the Nano-scale Electrospray Deposition System

Figure 1:
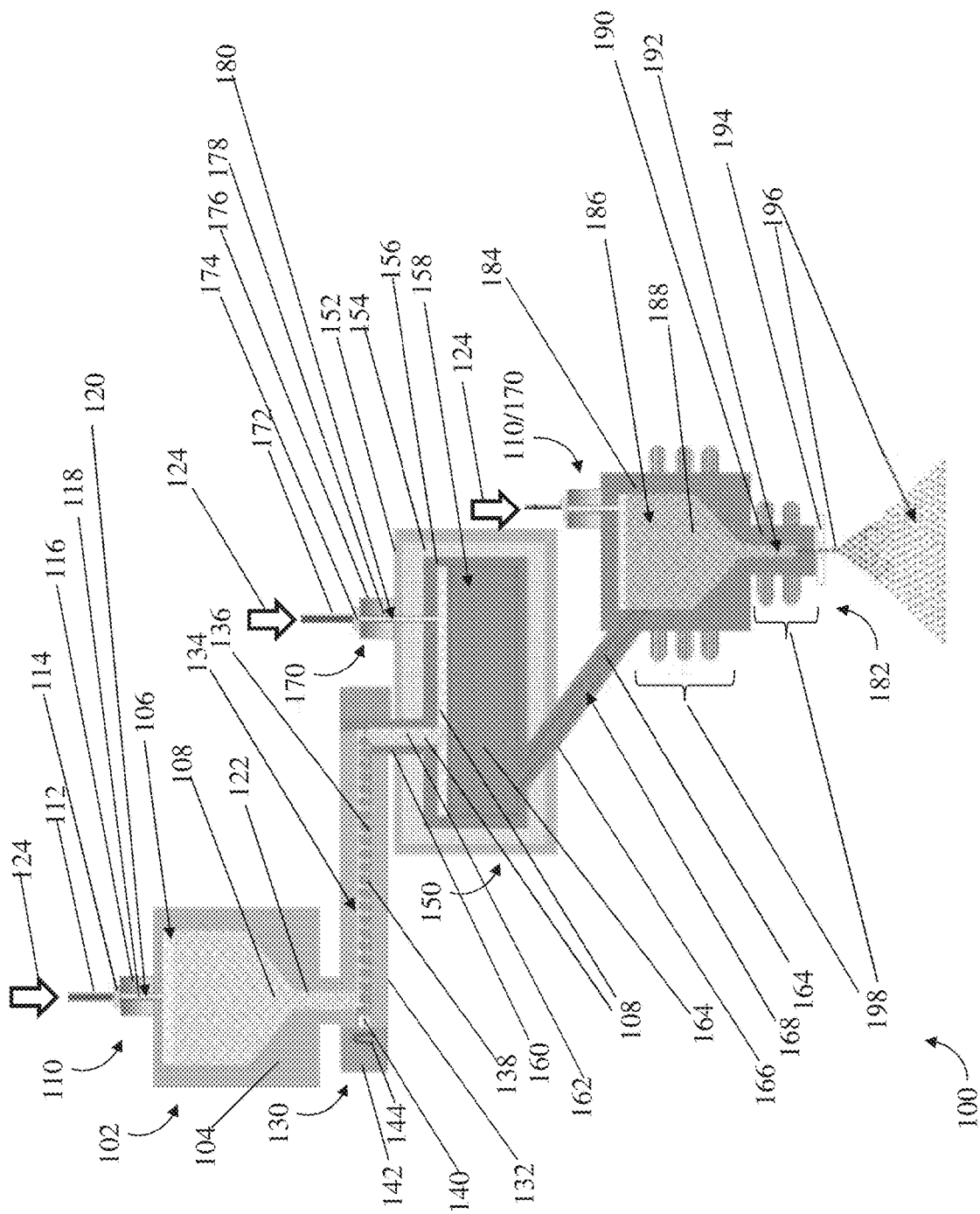
FIG. 1 depicts a sectional schematic view of a nano-scale electrospray deposition system.

To provide additional details for an improved understanding of selected embodiments of the present disclosure, reference is now made to FIG. 1 illustrating a sectional schematic view of one embodiment of a nano-scale electrospray deposition system (100) that is configured to produce composite nano-particles, i.e., particulate nano-composites and objects fabricated from such nano-composites, including graduated nano-structures and gradient alloys. As used herein, the terms "nano-particles" and "nano-composites" indicate particles and composites that have a microstructure with a characteristic length scale of which is on the order of approximately 1 nano-meter (nm) to approximately 10 nm.

The nano-scale electrospray deposition system (100) is shown with a material supply bin (102). As shown, the material supply bin (102) includes an external casing (104) that defines a cavity (106) therein. The cavity (106) maintains a supply of raw materials (108) therein. A partial list of raw materials (108) is provided in Table 1 below. In one embodiment, in addition to the nano-particle addition, the supplied raw materials may include a first material, such as aluminum (Al) and a second material such as titanium (W), although such materials should not be considered limiting. It is understood that the aluminum (Al) and titanium (W), or other materials, are used to create the gradient alloys. The apparatus of the bin (102) that allows filling thereof is not shown. The bin (102) includes an inert gas input and regulating system (110) that includes a gas supply conduit (112), a sealing device (114), and a gas inlet stub (116) that forms a gas inlet conduit (118) and a cavity (120) therein. The gas inlet conduit (118) is in flow communication with the gas supply conduit (112). The regulating system (110) also includes a gas pressure regulating device (not shown). The bin (102) further includes a material outlet conduit (122). In at least one embodiment, the material supply bin (102) includes a heating subsystem configured to preheat the supply of raw materials (108). Accordingly, the nano-scale electrospray deposition system (100) provides a mechanism necessary for loading and supplying raw materials (108).

In operation of the regulating system (110), an inert gas (124) is used to provide a substantially air-free environment for the raw materials. The inert gas (124) enters the gas supply conduit (112) from a source (not shown). Examples of inert gases include, but are not limited to, nitrogen, argon, and carbon dioxide. The gas (124) flows through the gas supply conduit (112) toward the sealing device (114). A gas regulating device (not shown) regulates the gas pressure within the cavity (106) to a predetermined or configurable value. When the gas pressure within the cavity (106) decreases below the predetermined or configured value, the regulating device allows or enables inert gas (124) into the cavity (106) through the gas supply conduit (112). The inert gas (124) flows into the cavity (120) of the gas inlet conduit (118) and into the cavity (106) of the material supply bin (102). Accordingly, the raw materials (108) are protected from extended exposure to air through a blanket of an inert gas (124).

The nano-scale electrospray deposition system (100) also includes a raw materials transfer device (130) operatively coupled to the material supply bin (102) through the material outlet conduit (122). The raw material transfer device (130) is shown herein with a casing (132) that defines a cavity (134) therein that contains a screw element, or flighting (136). In the embodiment illustrated in FIG. 1, the raw materials transfer device (130) is a screw conveyor or an auger conveyor. Similarly, in one embodiment, the raw materials transfer device (130) may be any solid material handling device that transfers solid raw materials including, without limitation, such as a belt conveyor, a volumetric feeder, and a gravimetric feeder. In addition, in at least one embodiment, the raw materials transfer device (130) is adapted to transport materials in a liquid phase, and in some embodiments, with entrained solids therein. The materials transfer devices (130) for such embodiments include, without limitation, types of screw conveyors, belt conveyors, and positive displacement pumps. The flighting (136) includes a plurality of protrusions (138) that defines a helicoid configuration. The protrusions (138) are coupled to a flighting shaft (140) that is operatively coupled to a drive device (142) that rotates the flighting shaft (140) in the directions shown by the arrow (144). The drive device (142) is any motion device including, without limitation, a constant speed electric motor and a variable speed drive. A pitch of the helicoid protrusions (138) is proportional to a desired volume of the raw materials (108) per rotation of the flighting (136). In at least one embodiment, the raw materials transfer device (130) includes an inert gas input and regulating system similar to the system (110). At least some embodiments of the nano-scale electrospray deposition system (100) include a plurality of transfer devices (130). Accordingly, nano-scale electrospray deposition system (100) includes the capabilities to transfer raw materials (108) within the nano-scale electrospray deposition system (100) through one or more material transfer devices (130).

The raw materials transfer device (130) is coupled in flow communication with a tundish (150). As shown, the tundish (150) includes a casing (152) extending over at least one layer of insulation (154), that in turn extends over an interior liner (156). The interior liner (156) defines a molten material cavity (158) therein. The liner (156) extends to the raw materials device (130) to form a tundish inlet conduit (160) and defines a cavity (162) therein that is coupled in flow communication with the flighting (136) to receive raw material (108) therefrom. The tundish (150) includes a heating subsystem or heating element (not shown), and hereinafter referred to as the heating subsystem, that melts the raw material (108) into a molten state to form molten material (164). The heating subsystem includes any heating mechanisms with sufficient heat generation capacity to melt or change the state of the raw materials (108) into the molten state (164). Examples of heating mechanisms, including, without limitation, induction heating devices and natural gas combustion devices. The liner (156) further extends from tundish (150) to form a tundish outlet conduit (166) and defines a cavity (168) therein that is coupled in flow communication with molten material cavity (158) to receive molten material (164) therefrom. The tundish (150) also includes an inert gas input and regulating system (170) that includes a gas supply conduit (172), a sealing device (174), and a gas inlet stub (176) that forms a gas inlet conduit (178) and a cavity (180) therein, where the gas inlet conduit (178) is in flow communication with the gas supply conduit (172). Operation of the inert gas input and regulating system (170) is substantially similar to operation of the inert gas input and regulating system (110) described elsewhere herein. Accordingly, the nano-scale electrospray deposition system (100) includes tools to melt to the raw materials (108) and maintain the melted raw materials in a molten state or condition for further use in the electrospray fabrication process, as discussed further herein.

The nano-scale electrospray deposition system (100) further includes a nano-scale electrospray deposition apparatus (182). As shown, the apparatus (182) includes a casing (184)

that defines a molten material reservoir (186) therein. The reservoir (186) is operatively coupled in flow communication with tundish outlet conduit (166) to receive the molten material (164) therefrom and maintain the molten material (164) therein. Additional materials (not shown in FIG. 1) may be added to the molten material (164) to form one or more nano-scale compositions (188). The casing (184) includes a casing extension (190) that defines a reservoir outlet capillary (192) operatively coupled in flow communication with the molten material reservoir (186). The nano-scale electrospray deposition apparatus (182) also includes an outlet nozzle (194) operatively coupled in flow communication with the reservoir outlet capillary (192) to fabricate the nano-scale materials, e.g., nano-particles or nano-composites (196). The apparatus (182) further includes heating devices (198), shown herein as inductive heating coils, and an inert gas input and regulating system (110) and (170). Additional structural and operational descriptions of nano-scale electrospray deposition apparatus (182) are discussed further herein. Accordingly, the molten materials (184) in the form of specific nano-scale compositions (188) are electrosprayed to fabricate specific nano-particles or nano-composites (196).

In operation, the nano-scale electrospray deposition system (100) receives a supply of raw materials (108) within the cavity (106) of the material supply bin (102). Once the bin (102) is filled to a predetermined level with the raw materials, the bin (102) is sealed by the inert gas input and regulating system (110) to regulate the gas (124) pressure within the cavity (106). The gas pressure may be a predetermined value or a configurable value. The predetermined and configured value of gas (124) pressure in the material supply bin (102) reduces ingress of air into the bin (102) and also mitigates exposure of the raw materials (108) to air. In one embodiment, the gas pressure ranges from about 10 pounds per square inch (psi) (about 69 kiloPascal (kPa)) to about 20 psi (about 138 kPa). It is understood that some of the raw materials (108) may be reactive with air. In addition, the inert gas (124) pressure provides a motive force in addition to gravity to transfer the raw materials (108) from the bin (102) to the raw materials transfer device (130) through the material outlet conduit (122). Furthermore, the gas (124) prevents formation of a vacuum lock when the materials (108) exit the bin (102). Accordingly, nano-scale electrospray deposition system (100) transfers raw materials (108) through one or more material transfer devices (130).

In operation, the device (130) transfers the raw materials (108) at a predetermined and configurable rate to the tundish (150). The tundish (150) heats the raw materials (108) to a melting point of the materials (108) to produce a molten material (164) that is stored in the molten state within the molten material cavity (158). In one embodiment, the molten material (164) temperature ranges from about 800 degrees Celsius (° C.) (about 1472 degrees Fahrenheit (° F.)) to about 1,000° C. (1832° F.), with the temperature being dependent on the melting point of the composition. The inert gas input and regulating system (170) regulates the gas (124) pressure within the cavity (158) to a predetermined and configurable value to minimize exposure of the molten material (164) to air, provide a motive force in addition to gravity to transfer the molten material (164) from the tundish (150) to the nano-scale electrospray deposition apparatus (182) through the tundish outlet conduit (166), and prevent the formation of a vacuum lock when the molten material (164) exits the tundish (150). In one embodiment, the regulating system (170) regulates the pressure of the gas (124) in a range from about 10 psi (69 kPa) to about 20 psi (138 kPa). The nano-scale electrospray deposition apparatus (182) receives the molten material (164) within the molten material reservoir (186) and mixes the material (164) with other materials to produce one or more nano-scale compositions (188) therein. The inert gas input and regulating system (110) and (170) regulates the gas (124) pressure within the reservoir (186) to a predetermined, or in one embodiment configurable, value to minimize exposure of the nano-scale compositions (188) to air, provide a motive force in addition to gravity (and electric fields, discussed further elsewhere herein) to fabricate the nano-scale materials, e.g., nano-particles and nano-composites (196), with the gas (124) to prevent formation of a vacuum lock when the nano-composites (196) exit the bin (102). In one embodiment, system (110) regulates the gas pressure of the gas (124) from about 10 psi (69 kPa) to about 20 psi (138 kPa). Accordingly, the raw materials (108) are melted and transferred to a nano-scale electrospray deposition apparatus (182) for fabricating nano-particles and nano-composites (196), and engineered products with tailored properties.

Construction of the Nano-Scale Electrospray Deposition Apparatus

Figure 2:
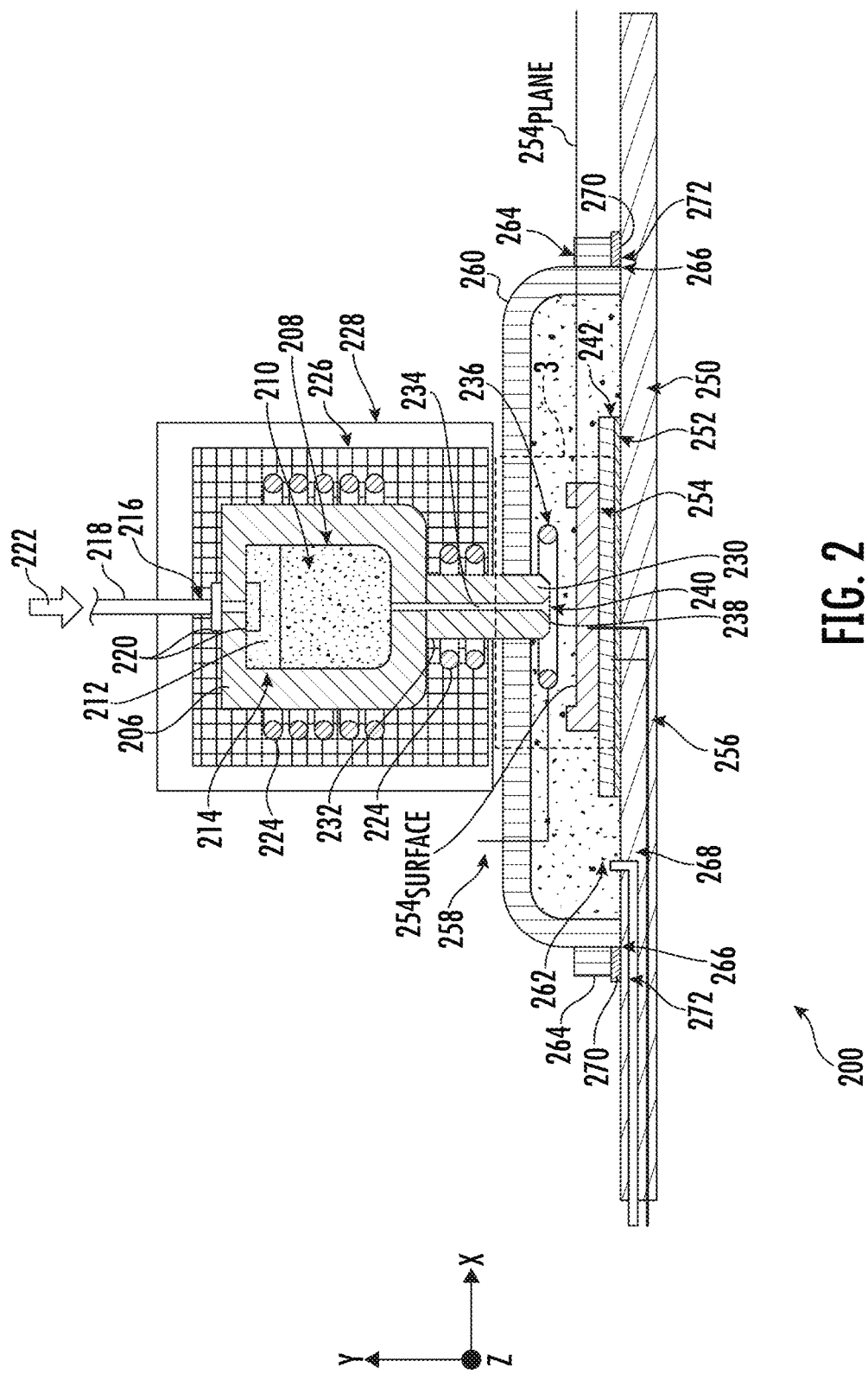
FIG. 2 depicts a sectional schematic view of one embodiment of a nano-scale electrospray deposition apparatus.

Referring to FIG. 2, a sectional schematic view is provided illustrating one embodiment of a nano-scale electrospray deposition apparatus (200). Each of the dimensions, including height ("Y"), length ("X"), and width (or depth) ("Z"), are shown for reference, where the dimensions are orthogonal to each other in physical space. The apparatus (200) is shown with a casing (206) that defines a molten material reservoir (208) for holding a molten material (210) therein. In one embodiment, the molten material (210) temperature ranges from 800° C. (1472° F.) to about 1,000° C. (1832° F.), with the temperature being dependent on the melting point of the composition. A reservoir gas (212) occupies a portion (214) of the molten material reservoir (208) adjacent to the molten material (210). The apparatus (200) further includes an inert gas input and regulating system (216) that includes a gas supply conduit (218) and sealing devices (220), where the system (216) is in flow communication with the portion (214) of the molten material reservoir (208). The inert gas input and regulating system (216) regulates a gas flow (222) through conduit (218) to regulate reservoir gas (212) pressure within the reservoir (208) to a predetermined or configurable value. In one embodiment, system (216) regulates the gas pressure of the reservoir gas, e.g. inert gas, (212) from about 10 psi (69 kPa) to about 20 psi (138 kPa). The gas pressure (212) in the reservoir (208) reduces ingress of air into the reservoir (208) thereby mitigating exposure of the molten material (210) to air. In one embodiment, select forms of the molten material (210) may be reactive with air, and as such mitigation of exposure to air may be warranted. In addition, the reservoir gas pressure (212) provides a motive force in addition to gravity (and electric fields) to the transfer the molten material (210) through the apparatus (200), and prevent the formation of vacuum lock when the molten material (210 exits the apparatus (200). Accordingly, the molten material (210) is maintained under pressure and air infiltration is prevented through the pressurization of the reservoir (208) with an inert gas (212).

The nano-scale electrospray deposition apparatus (200) is shown with a plurality of induction heating coils (224) that extend around an external surface of the casing (206). The heating coils (224) serve to heat and induce mixing of the molten material (210) housing within the casing (206). In one embodiment, the heating coils (224) are replaced with an alternative heating method to provide supplementary heating to the material (210). A non-limiting example of an alternative heating method includes to, natural gas combustion. A faraday cage (226) is shown operatively coupled to the casing (206). In this illustration, the faraday cage (226) is positioned around an external surface of the casing (206). The faraday cage (226) functions to shield the material within the casing (206) from electromagnetic radiation produced, that in one embodiment is a byproduct of the induction heating coils (224). A vented heat shield (228) is shown operatively coupled to the faraday cage (226). In this illustration, the vented heat shield (228) is positioned around an external surface of the faraday cage (226). The vented heat shield (228) functions to shield an environment adjacent to an external surface of the heat shield from a substantial portion of the heat produced by the induction heating coils (224). An electrospray nozzle (230) is coupled to the bottom (232) of the casing (206) of the material reservoir (208). A capillary tube (234) is defined in the bottom (232) of the casing (206) and extends through the electrospray nozzle (230). The capillary tube (234) is coupled in flow communication with the material reservoir (208). An extractor electrode (236) is coupled to the electrospray nozzle (230), and is positioned near the bottom (238) of the electrospray nozzle (230) where the capillary tube (234) defines a capillary tube exit (240). In the illustrated embodiment, the exit is an orifice (240). In one embodiment, any other exit configuration that enables operation of the nano-scale electrospray deposition apparatus, e.g., apparatus 200, as described herein is used in place of the orifice. In an embodiment where the electrospray nozzle (230) is an electrically conductive nozzle, the nozzle is coated with an insulative coating (not shown). Similarly, in an embodiment where the electrospray nozzle (230) is fabricated with a dielectric material, the nozzle is coated with a conductive coating (not shown). Accordingly, the molten material (210) is maintained in a molten condition in preparation for transfer from the reservoir (208) through the capillary tube (234) toward the electrospray nozzle (230).

Figure 3:
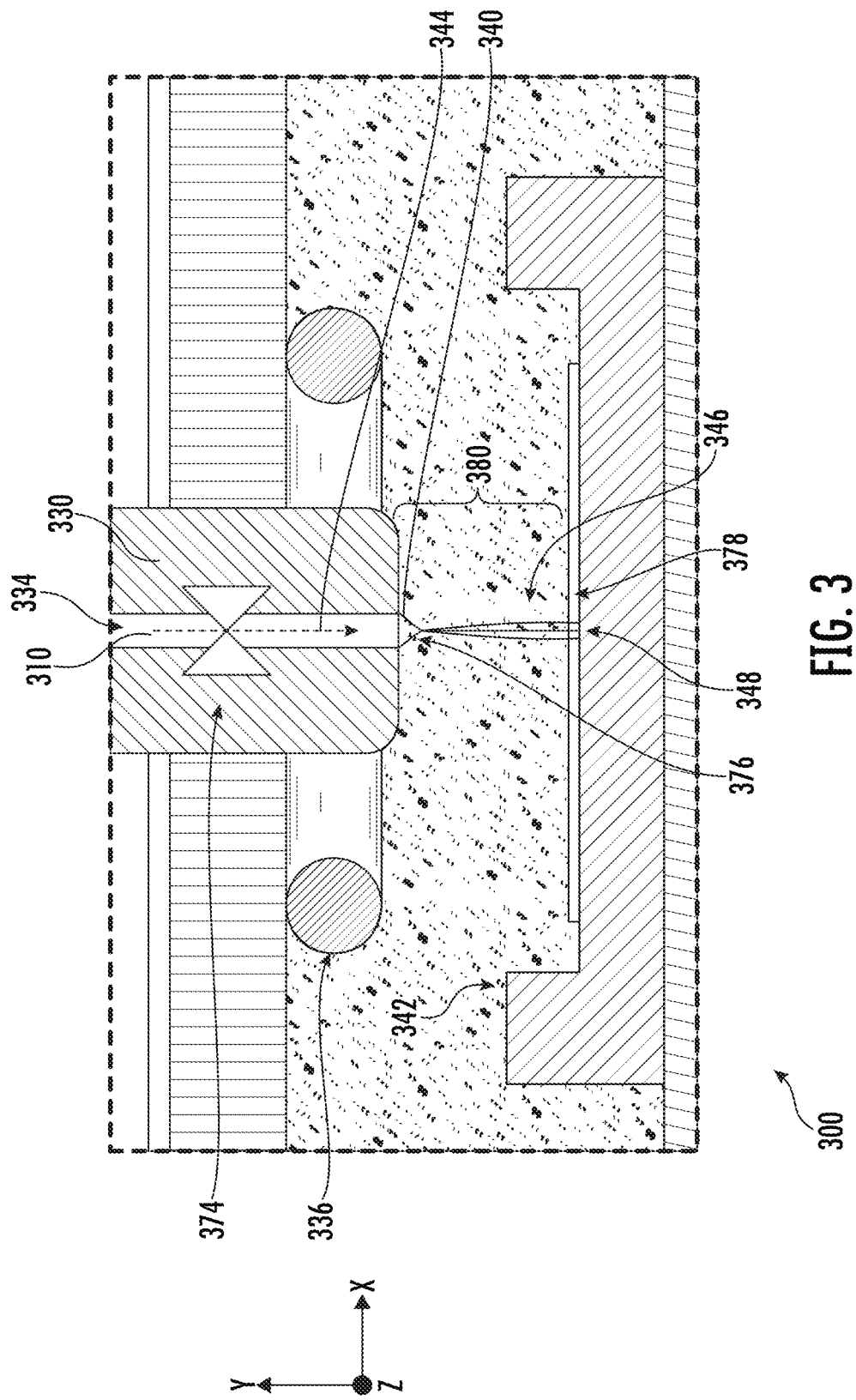
FIG. 3 depicts a sectional schematic view of a magnified portion of a nano-scale electrospray deposition apparatus.

Referring to FIG. 3, a sectional schematic view is provided illustrating a magnified portion of a nano-scale electrospray deposition apparatus (300) taken about an area 3 (shown in FIG. 2). An extractor electrode (336) is a combination of two components, i.e., an electrode for generating an electric field and an inductive coil for generating a magnetic field. In one embodiment, the electrode and inductive coil are separate elements.

The combined extractor electrode and inductive element (336) (hereon referred to as the extractor electrode (336)) generates an electric field to maintain the electrospray nozzle at a predetermined or defined and configured electric potential. The electric field extracts the molten material (210) in the form of a jet (310) from the electrospray nozzle (330) in the direction of the arrow (344) to form a stream of droplets (346) of nano-particle size and drives the droplets (346) toward the stage (342). In the illustrated embodiment, the electrospray nozzle (330) is similar to the electrospray nozzle (230) and the stage (342) is similar to the stage (242). The extractor electrode (336) generates a magnetic field to limit dispersion of the stream of droplets (346). The electrosprayed droplets (346) are charged with the same polarity, which causes the droplets (246) to repel from one another as they are dispersed. It is understood in the art that charged particles moving across magnetic field lines experience a force that is orthogonal to both the magnetic field lines and the motion of the charged particles. If the magnetic field is strong relative to the velocity of the charged particles, the charge particles tend to orbit magnetic field lines while moving along them. Thus, the dispersive tendencies of the stream of charged droplets (346) are countered by the magnetic field. Accordingly, the extractor electrode (336) produces the expelled stream of droplets (346) that is sufficiently focused to provide deposition control and accuracy on the nano-scale level.

In the exemplary embodiment, the extractor electrode (336) has a toroidal shape with the center of the toroid penetrated by the electrospray nozzle (330). Examples of toroidal shapes may include, but are not limited to torus or toroid shapes. In one embodiment, the extractor electrode (336) includes one or more turns of wire (not shown in FIG. 3), with the turns producing a magnetic field increasing strength for the same amount of current. In one embodiment, the quantity of turns is proportional to the increase strength of the magnetic field. The extractor electrode (336) is shaped to provide the electric field and the magnetic field with characteristics useful for extracting the molten material jet (310) from the electrospray nozzle (330), driving the stream of droplets (346) toward the stage (342), and focusing the stream of droplets on a deposition area (348) on the stage (342). In the illustrated embodiments described herein, the droplets (346) are ejected from the orifice (340) at their associated terminal velocity of approximately 1.0026 meters per second (m/s). In one embodiment, the terminal velocity may range from 1.00 m/s to about 1.05 m/s. In one embodiment, any ejection velocity that enables operation of the nano-scale electrospray deposition apparatus as described herein may be used. As the charged nano-particles (not shown) within the electrosprayed droplets (346) are directed to a target position on the deposition area (348), the velocity of the droplets (346) are controlled via the combined extraction electrode and inductive coil positioner (336) for a predetermined and configurable distance to provide for a relatively gentle impact of the droplets (346) on the object (378). This gentle impact mitigates splashing and bouncing activity of the droplets (346) with respect to the object (378), and further initiates bonding of the droplets (346) to the object (378). A reduced impact velocity offers control of the trajectory of each droplet (346) making it possible to buildup complex objects, such as fabricated object (378). Accordingly, the supply of droplets (346) is channeled into a narrow stream (346) in a predetermined and configurable pattern and ejected from the electrospray nozzle (330) at a selected rate onto a target (not shown) or a newly formed layer of the fabricated object (378) are aligned, where the alignment by a combined extractor and inductive element (336) deposits the droplets (346) at a predetermined and configurable point of contact.

Referring again to FIG. 2, the nano-scale electrospray deposition apparatus (200) is shown with a stage (242) that serves as the target for the electrosprayed stream of droplets (346). The stage (242) is configured for movement relative to the electrospray nozzle (230) in three orthogonal dimensions X, Y, and Z. The stage (242) is typically electrically grounded so that it forms a planar endpoint for the electrical field. In the exemplary embodiment, the stage (242) comprises a utility base plate (250), a cooling chuck (252), and an object holder (254). The object holder (254) is configured for holding a fabricated object (not shown in FIG. 2) that results from the electrospray process. The object holder includes a surface ($254_{Surface}$) defining a lateral plane ($254_{Plane}$). In one embodiment, the object holder (254) holds a substrate (not shown) onto which the electrosprayed stream of droplets (346) is deposited. In other embodiments, no substrate is used and the electrospray deposits directly onto the object holder (254). The cooling chuck (252) is positioned underneath the object holder (254) and coupled thereto. The cooling chuck (252) is configured for cooling or otherwise reducing the temperature of the object holder (254). In at least one embodiment, the cooling chuck (252) is equipped with one or more thermoelectric cooling chips (not shown) that use direct current (DC) to transfer heat from the object holder (254) to the utility base plate (250). In one embodiment, any method of transferring heat from the object holder (254) that enables control of the temperature of the object holder (254) is applied to the cooling chuck (252) and/or the object holder (254). Examples of the heat transfer method include, but are not limited to, conductive heat transfer. The utility base plate (250) is exposed to ambient air and may be cooled or subject to a cooling process with natural convection or forced air flow. Wiring (256) is operatively coupled to the utility base plate (250) for powering the cooling chuck (252) and for any sensors (not shown) that may be imbedded in the object holder (254). Extractor electrode wiring (258) provides electrical current to the extractor electrode (236). Accordingly, the nano-scale electrospray deposition apparatus (200) includes components to provide for proper handling of the droplets (346) upon egress from the electrospray nozzle (230).

Continuing to refer to FIG. 2, the nano-scale electrospray deposition apparatus (200) has an enclosure (260) operatively coupled to the electrospray nozzle (230) and the molten material reservoir (208). In one embodiment, the enclosure (260) is comprised of quartz, or another suitable material. The enclosure (260) is shaped such that when placed in contact with the stage (242), the enclosure (260) and the stage (242) define an enclosure cavity (262) that serves as a controlled environment for the electrospraying process. The enclosure (260) has a frame (264) that is slidingly coupled to the outer edges (266) of the enclosure (260). The frame (264) maintains contact with the stage (242) as the stage (242) is subject to movement. This contact keeps the enclosure cavity (262) fully enclosed during electrospray object fabrication. The utility base plate (250) has a fluid inlet (268) to inject gases (not shown) into the enclosure cavity (262). An enclosure gasket (270) positioned relative to the bottom (272) of the enclosure frame (264) improves the sealing of the enclosure cavity (262) and allows or enables the stage (232) to move laterally, i.e., in the X and Y dimensions without disturbing a sealing of the enclosure cavity (262). In one embodiment, the enclosure gasket (270) is comprised of a felt material, although this material should not be considered limiting. For example, in one embodiment the gasket (270) may be made of one or more alternative materials that support the functionality of the gasket (270). Accordingly, the nano-scale electrospray deposition apparatus (200) includes components to provide for proper handling of the droplets (346) upon egress from the electrospray nozzle (230).

The gas inlet (268) functions as an ingress for the enclosure cavity (262) to deliver an inert gas. In one embodiment, the gas within the cavity (262) is provided at a predetermined and configurable temperature profile and atmospheric conditions within the cavity (262). In one embodiment, the inert gas is argon. Similarly, in one embodiment, the inert gas may be any material or fluid that supports the desired environment in enclosure cavity (262) as described herein. In at least one embodiment, the argon gas within the enclosure cavity (262) is maintained at a predetermined and configurable pressure of approximately atmospheric pressure, e.g. 14.7 pounds per square inch (psi), (101.325 kiloPascal (kPa)). Similarly, in one embodiment, the argon gas is maintained at any pressure that enables operation of the nano-scale electrospray deposition apparatus, such as apparatus (200), as described herein. In one embodiment, a partial vacuum is pulled within the enclosure cavity (262), i.e., approximately 1 psi (6.9 kPa) to about 10 psi (69 kPa). In the illustrated embodiment, the argon gas is injected into the enclosure cavity (262) at a temperature of approximately 25° C. to about 500° C. (approximately 77° F. to 932° F.). In one embodiment, the argon gas is injected into the enclosure cavity (262) at any temperature that enables operation of the nano-scale electrospray deposition apparatus (including, without limitation, apparatus (200)) as described herein. Accordingly, an inert gas is used to maintain the desired environment for the droplets (346) during object fabrication.

Referring again to FIG. 3, in at least one embodiment, the electrospray nozzle (330) has a valve (374) to control the flow rate of the molten material jet (310) through the nozzle (330) to form the droplets (346). In one embodiment, a method of regulating flow of the molten material jet (310) is used including, without limitation, a pump operatively coupled to a variable speed drive device. In a further embodiment, no regulating devices are used and flow of the molten material jet (310) is controlled, for example, and without limitation, by changing the pressure of the reservoir gas (212) in the upper portion (214) of the molten material reservoir (208). In a further embodiment, the flow rate of the molten material jet (310) is determined through regulation of the concentrations of the individual constituents, as discussed further with respect to FIG. 8. in the molten material jet (310) between approximately $10^{-4}$ weight percent (wt %) to approximately 100 wt %.

The flow of the molten material jet (310) may be controlled electrohydrodynamically. Such control of flow of the molten material jet (310) is achieved through modulation of one or more electrical characteristics of electric power transmitted to the extractor electrode (336). Examples of these electrical characteristics include, but are not limited to, modulation of voltage, current, frequency, and waveform. For example, the controlled voltage may be within a range of approximately 0.5 kilovolts (kv) to approximately 40 kv, the current may be maintained within a range of approximately 0.1 microampere (pumps) to 3.0 amps, and the frequency may be controlled from direct current (DC) with a substantially constant frequency of 0 Hertz (Hz) to an alternating current (AC) of approximately 100 gigahertz (GHz). In one embodiment, any voltages, currents, and frequencies that enable operation of the extractor electrode (336) as described herein may be used. Also, in one embodiment, any waveforms that enable operation of the extractor electrode as described herein may be used, including, without limitation, sine, square, and triangular waveforms. Accordingly, control of the flow rate of the molten material jet (310) provides for control of the size of the droplets (346), where flow control is enabled through one or more of control of constituent concentrations in the molten material jet (310), modulation of the electrical characteristics of the extractor electrode (336), regulating the pressure in the molten material reservoir (208), and regulating a position of the valve (374), to produce a flow rate of approximately $10^{-3}$ nano-grams per minute (ng/min) to approximately $10^{8}$ ng/min.

The electrosprayed stream of droplets (346) emerges from a Taylor cone (376) that forms on the capillary tube exit port, or orifice (340) when the electric field draws the molten material jet (310) out of the capillary tube (334). Dispersion of the stream of droplets (346) is limited by the magnetic field. A region on fabricated object (378) where the stream of droplets (346) impacts is referred to as the deposition area (348). The fabricated object (378) includes successive deposition layers (see FIGS. 10-14). The stage (342) is subject to lateral movement while the stream of droplets (346) impacts on the fabricated object (378), forming the current deposition layer over previous deposition layers. The distance between the electrospray apparatus (300) and the fabricated object (378) is referred to as the stand-off distance (380) or distance-to-deposition. A target stand-off distance (380) is determined for each pass of the nozzle (330) over the fabricated object (378) to deposit each layer. As the droplets (346) are deposited on the fabricated object (378), the actual stand-off distance (380) will tend to decrease during each pass of the nozzle (330) over the fabricated object (378). In one embodiment, the target standoff distance (380) is approximately 2 millimeters (mm) for each pass. It is understood in the art that the distance (380) may range from about 1.5 to about 2.5 mm based on the composition (310) and, in one embodiment, the flow rate of the composition (310). Similarly, in one embodiment, the standoff distance (380) may be any value that enables operation of the nano-scale electrospray deposition apparatus (200). If no action were taken, the stand-off distance (380) would decrease for every pass of the nozzle (330) over the fabricated object (378). Accordingly, the stand-off distance (380) is maintained at or near a target stand-off distance by adjusting the vertical position of the stage (342) to facilitate deposition of the droplets (346) on the fabricated object (378) at predetermined and configured velocities with predetermined and configured temperatures.

Figure 4:
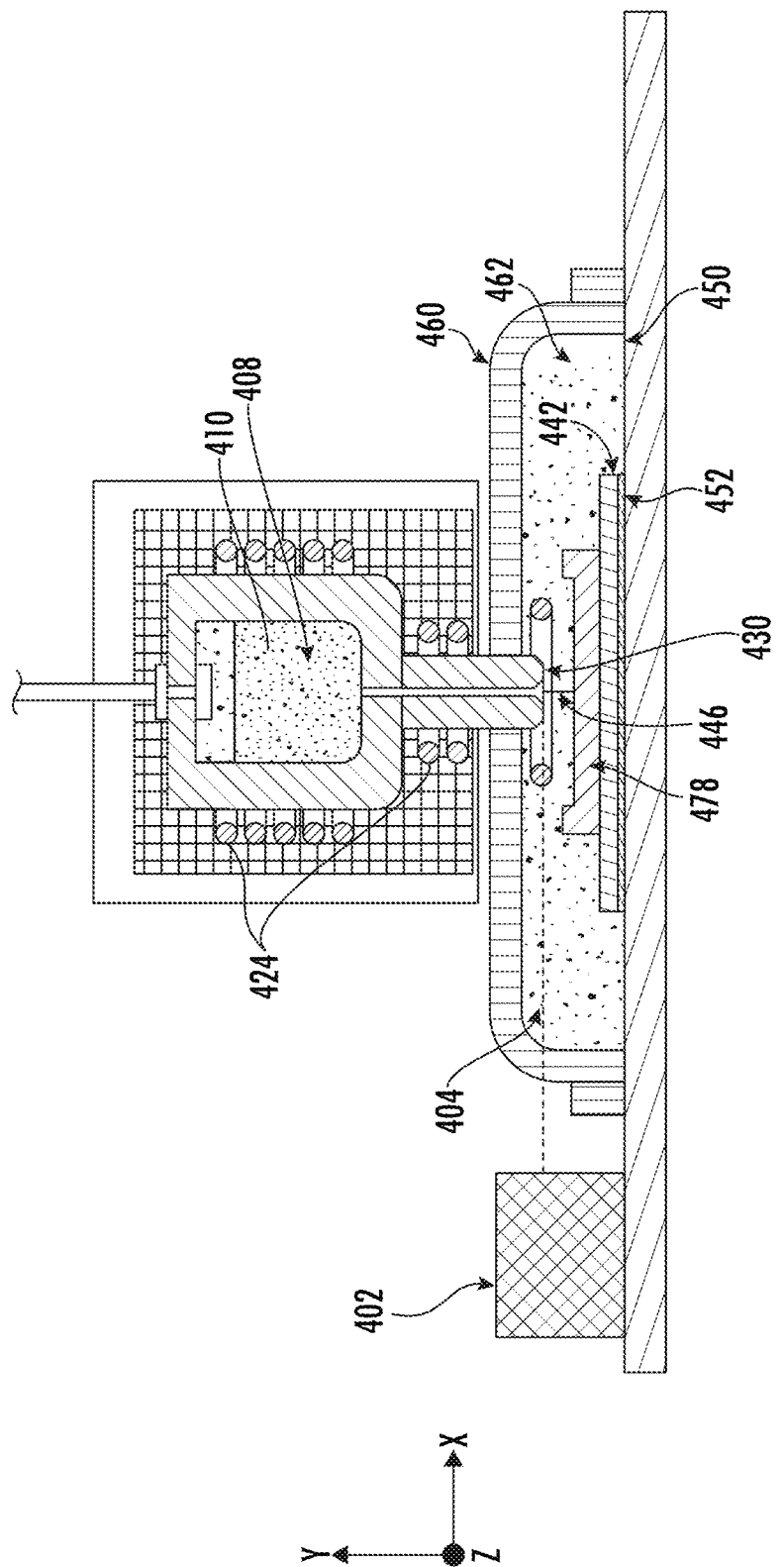
FIG. 4 depicts a sectional schematic view of another embodiment of a nano-scale electrospray deposition apparatus.

Additional Construction Embodiments of the Nano-Scale Electrospray Deposition Apparatus Referring to FIG. 4, a sectional schematic view is provided illustrating another embodiment of a nano-scale electrospray deposition apparatus (400). As shown, the apparatus (400) include a heating device (402) for providing thermal energy to the stream of droplets (446). In one embodiment, the heating device (402) is used to add thermal energy to the stream of droplets (446) when the temperature of the droplets (446) has sufficiently been reduced before impact with the fabricated object (478). In the illustrated embodiment, the fabricated object (478) is similar to the fabricated object (378). In at least one embodiment, the heating device (402) is a radiation source that supplies thermal energy to the stream of droplets (446) with a radiation beam (404). The heating device (402) emits radiation in a portion of the energy spectrum, for example, and without limitation, the infrared portion, and the radiation beam (404) is a coherent photon source, for example, and without limitation, a laser beam. In one embodiment, the heating device (402) emits a radiation beam (404) in any other portion of the energy spectrum, for example, and without limitation, the x-ray portion. Also, in some embodiments, the radiation beam (404) includes non-coherent photons of varying wavelengths, to which the droplets (446) appear opaque. In the illustrated embodiment, the heating device (402) is mounted outside the enclosure (460) and the radiation beam (404) passes through the enclosure (460), which in the illustrated embodiment is made of quartz. In some embodiments, the heating device (402) is operatively coupled to the utility base plate (450) of the stage (442). In the illustrated embodiment, the stage (442) is similar to the stage (342). In one embodiment, as the stage (442) moves or is moved relative to the electrospray nozzle (430) and hence the stream of droplets (446), aiming control features for the radiation beam (404) are employed to provide for illumination of the droplets (446) with the beam (404). In the illustrated embodiment, the electrospray nozzle (430) is similar to the electrospray nozzle (330). Alternatively, the heating device (402) may be operatively coupled to the enclosure (460) or to the electrospray nozzle (430). Accordingly, a temperature control device may be used to control the temperature of the droplets (446).

The properties of the fabricated object (478) may be adversely affected if the droplets (446) impact when the temperature of the droplets (446) decreases below an optimum temperature range. In one embodiment, the optimum temperature range of the droplets (446) is from about 800° C. to about 1,000° C. (1472 to 1832° F.). Control of the temperature of the droplets (446) is used to build one or more desired nano-structures. In one embodiment, the temperature of the molten material (410) in the reservoir (408) is maintained at approximately 1000° C., e.g. 1832° F. through thermal energy provided by the induction heating coils (424). Also, in this embodiment, the stage (442) and the fabricated object (478) are electrically grounded and their temperatures are subject to control through a cooling chuck (452). The cooling chuck (452) is similar to the cooling chuck (252). The droplets (446) are expelled from electrospray nozzle (430) and impinge on the stage (442). At the point of ejection from the nozzle (430), the droplets (446) are at approximately 1000° C., e.g. 1832° F., due to the transfer of thermal energy from the induction heating coils (424) to the molten material (410). In this embodiment, the target temperature for the droplets (446) at the point of impact on the fabricated object (478) is approximately 500° C., e.g. 932° F., which, in this embodiment, is below a recrystallization temperature for the associated formulation. As the droplets (446) are subject to movement toward the fabricated object (478), the heating device (402) adds thermal energy to the stream of droplets (446) through the emission of the beam (404). In addition, the inert argon gas within the enclosure cavity (462) is maintained at a temperature of approximately 500° C., e.g. 932° F., to support controlling the temperature of the droplets (446) as the droplets (446) travel through the heated argon gas from the nozzle (430) to the fabricated object (478).

The control of the temperature of the droplets (446) is controlled throughout the sequence of droplet (446) deposition. The initial temperature of the molten material (410) at the point of ejection from the nozzle (430) is controlled to a predetermined and configured value. The distance between the nozzle (430) and the fabricated object (478), i.e., the stand-off distance (380), is controlled to a configured target value. The temperature of the fabricated object (478) is maintained at a predetermined and configured temperature through the cooling chuck (452). The temperature of the argon gas the droplets (446) traverse is maintained at a predetermined or configured value as the droplets (446) traverse the stand-off distance (380). The addition of thermal energy into the droplets (446) through the beam (404) from the heating device (402) prior to the droplets (446) impacting the object (478) facilitates maintaining the droplets (446) at a predetermined and configured temperature value. Accordingly, at least a portion of the thermodynamic characteristics of the object (478) fabrication process is balanced.

Figure 5:
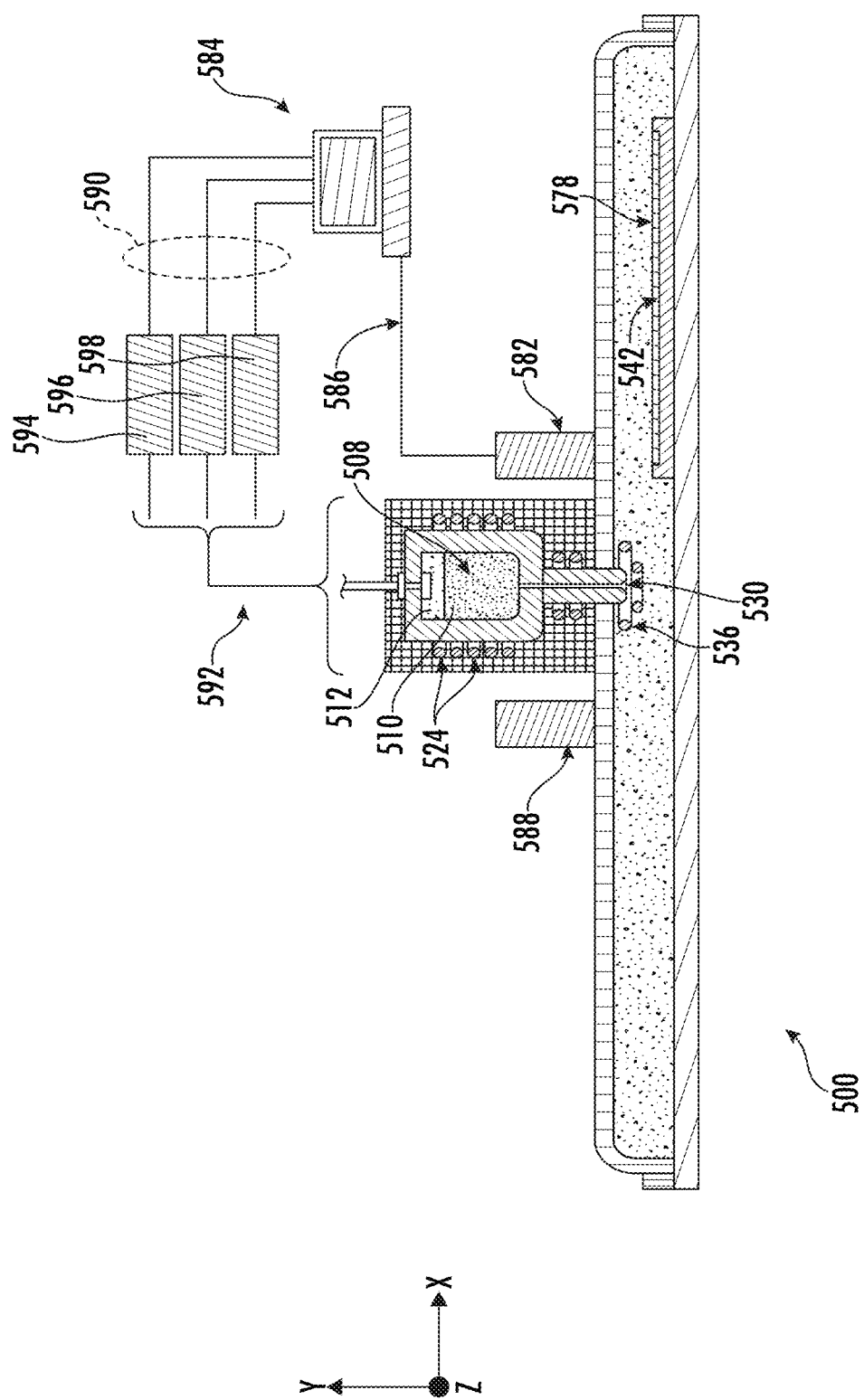
FIG. 5 depicts a sectional schematic view of yet another embodiment of a nano-scale electrospray deposition apparatus.

Referring to FIG. 5, a sectional schematic view is provided illustrating yet another embodiment of a nano-scale electrospray deposition apparatus (500). The apparatus (500) is shown with a first optical profilometer (582) that is configured to measure the distance from the first optical profilometer (582) to the fabricated object (578). In the illustrated embodiment, the fabricated object (578) is similar to the fabricated object (478). As the stage (542) is subject to movement, the first profilometer (582) measures the distance from the stage (542) to the fabricated object (578) at specific time intervals. Profile data about the current deposited layer (not shown in FIG. 5) of the fabricated object (578) is created. In the illustrated embodiment, the stage (542) is similar to the stage (442). The profile data associated with the current deposited layer is sent to a main control unit (584) via a profilometer communication link (586), which may be wired or wireless. In some embodiments, a second optical profilometer (588) is employed, and in some other embodiments more than two optical profilometers are employed.

The main control unit (584) uses collected profile data to control the electrospray apparatus (500) during deposition of a subsequent deposition layer. For deposition of the subsequent deposition layer, the main control unit (584) subjects the stage (542) to movement in a vertical direction to maintain the stand-off distance (380) at the target stand-off distance, based on the profile data of the proceeding deposition layer. The main control unit (584) also uses the profile data to compensate for any detected errors in a previous deposition layer. For example, if the profile data of the proceeding deposition layer indicates that some region of the fabricated object (578) is greater than desired or expected, the main control unit (584) can make a correction on the subsequent deposition layer by modifying the flow rate of molten material (510) through the electrospray nozzle (530) when over a region of the fabricated object (578) identified with the detected error. In the illustrated embodiment, the electrospray nozzle (530) is similar to the electrospray nozzle (430). Likewise, if the profile data of the proceeding deposition layer indicates that some region of the fabricated object (578) is too shallow or shallower than expected, the main control unit (584) can make a correction on the subsequent deposition layer by modifying the flow rate of molten material (510) through the electrospray nozzle (530) when the nozzle (530) is over the associated region of the fabricated object (578) identified with the detected error. The main control unit (584) controls the flow rate of the molten material (510) through using the valve (374) or in other ways, such as changing the pressure of the reservoir gas (512) in the material reservoir (508) or changing the electrical conditions of the extractor electrode (536).

The main control unit (584) is connected by main control unit communication links (590) to one or more sub-control units operatively coupled to the associated devices through device communications links (592). The illustrated embodiment has a first sub-control unit (594) for controlling the stage (542), a second sub-control unit (596) for controlling the extractor electrode (536), and a third sub-control unit (598) for controlling the heating device (402). Other embodiments may have a different quantity of sub-control units, depending on the components that are to be regulated. The extractor electrode (536), the pressure in the molten material reservoir (508), the temperature of the molten material (510) through the induction heating coils (524), the cooling chuck (452) operatively coupled to the stage (542) and the fabricated object (578), the heating device (402), and the inert argon gas temperature within the enclosure cavity (462) are controlled through the main control unit (584) to control the temperature of the droplets (346) and (446) and the fabricated object (578). Accordingly, the nano-scale electrospray deposition apparatus (500) includes a control unit and one or more sub-control units to support fabrication of objects with varying levels of complexity.

Figure 6:
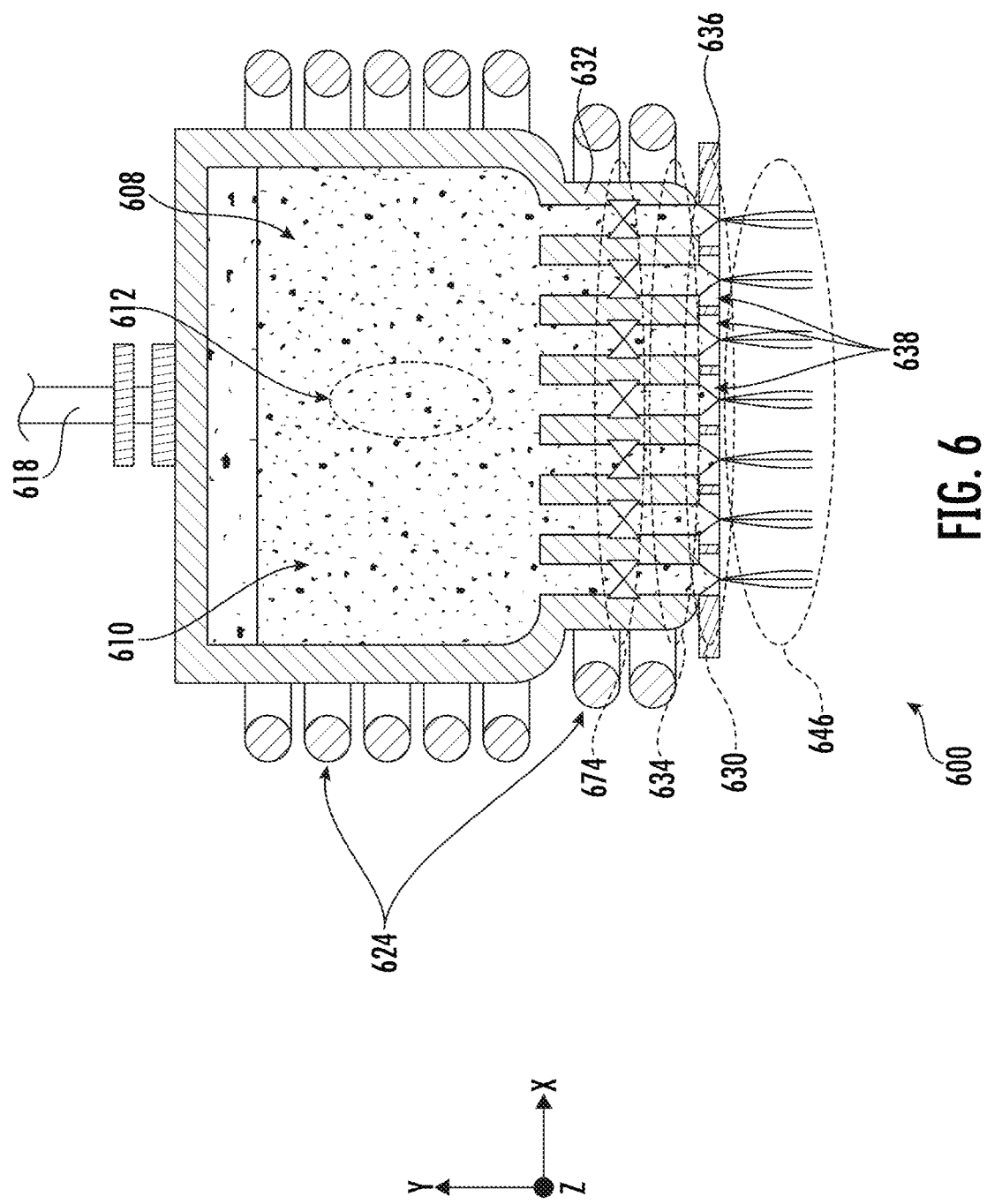
FIG. 6 depicts a sectional schematic view of yet another embodiment of a nano-scale electrospray deposition apparatus.

Referring to FIG. 6, a sectional schematic view is provided illustrating yet another embodiment of a nano-scale electrospray deposition apparatus (600). As shown, the apparatus (600) includes the molten material reservoir (608) that contains the molten material (610). As shown, the reservoir (608) is wider than the single-nozzle embodiments shown in FIGS. 2, 4, and 5, e.g., reservoirs (208), (408), and (508), to accommodate a greater volume of molten material (610). However, the size and dimensions of the reservoir (608) should not be considered limiting. The apparatus (600) includes a gas inlet conduit (618) for regulating pressure in the reservoir (608). In one embodiment, gas inlet conduit (618) regulates the pressure of the reservoir gas, e.g. inert gas, from about 10 psi (69 kPa) to about 20 psi (138 kPa). In the illustrated embodiment, the apparatus (600) includes a plurality of induction heating coils (624) that extend around an exterior surface of the molten material reservoir (608), serving to heat and maintain the molten material (610) in the liquid phase and induce mixing of the molten material (610). In some embodiments, alternative heating methods are used to provide supplementary heating including, without limitation, natural gas combustion. The increased volume of the molten material (610) over the volumes of the single-nozzle embodiments shown in FIGS. 2, 4, and 5 changes the determination of the thermal energy transfer from the heating coils (624) into the material reservoir (608). A center region (612) of the molten material (610) is positioned at a greater distance from the coils (624) than that for the smaller reservoirs 208, 408, and 508. Regardless of the method of introducing thermal energy into the molten material (610) to maintain or induce the material (610) within the predetermined temperature range, e.g. from about 800° C. to about 1,000° C. (1472 to 1832° F.), the heat flux into the center region (612) of the molten material (610) is sufficient to maintain the center region (612) within the predetermined temperature range. The predetermined rate of heat energy input into the molten material reservoir (608) will depend on, without limitation, the physical characteristics of the particular molten materials (610) and the physical characteristics, such as size and volume, of the reservoir (608).

The apparatus (600) includes an array of electrospray nozzles (630) coupled in flow communication with the material reservoir (608) through a manifold (632) housing an array of capillary tubes (634) and an array of valves (674). Each valve (674) is positioned within an associated capillary tube (634) and is similar to valve (374) configured to control the flow rate of molten material (610) through the associated nozzle (630). In the illustrated embodiment, the electrospray nozzle (630) is similar to the electrospray nozzle (530). In at least one embodiment, an alternative method of regulating flow of the molten material (610) is used including, without limitation, a pump operatively coupled to a variable speed drive device. In a further embodiment, no regulating devices are used and flow of the molten material (610) is controlled, for example, and without limitation, by changing the pressure of the reservoir (608). Apparatus (600) includes an extractor electrode plate (636) with a plurality of openings (638) through which an associated electrospray nozzle (630) at least partially extends. The extractor electrode plate (636) is similar to the extractor electrode (336) in that the plate (636) is shaped to provide both an electric field and a magnetic field with characteristics useful for extracting the molten material (610) from the electrospray nozzles (630), thereby driving an associated stream of droplets (646). In one embodiment, flow of the molten material (610) is controlled through modulation of one or more electrical characteristics of electric power transmitted to the extractor electrode plate (636), for example, and without limitation, voltage, current, frequency, and waveform. Accordingly, in order to achieve predetermined production rates of the fabricated objects (578), multiple electrospray nozzles (630) are used to achieve the predetermined deposition rates and to form the desired patterns with the predetermined materials.

Figure 7:
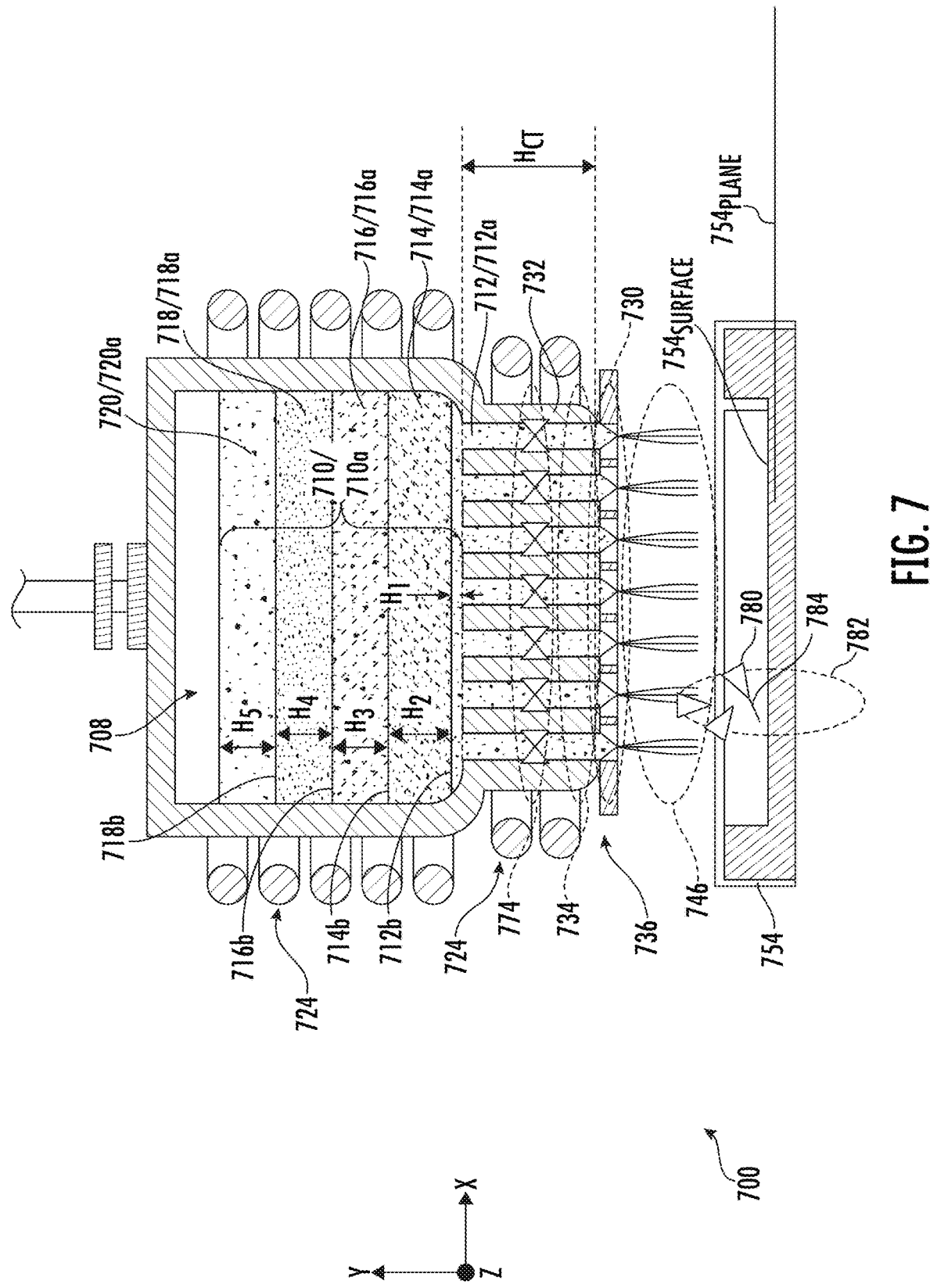
FIG. 7 depicts a sectional schematic view of yet another embodiment of a nano-scale electrospray deposition apparatus.

Referring to FIG. 7, a sectional schematic view is provided illustrating another embodiment of a nano-scale electrospray deposition apparatus (700). The apparatus (700) is a multi-nozzle electrospray apparatus similar to apparatus (600). The apparatus (700) includes the molten material reservoir (708) that contains a plurality of the molten materials (710), or compositions (710). The molten compositions (710) include a first molten composition (712), a second molten composition (714), a third molten composition (716), a fourth molten composition (718), and a fifth molten composition (720).

In one embodiment, the molten compositions (710) are each comprised of substantially different materials, that is, the five molten compositions (710) each have a different chemical composition. However, each of the compositions (710) is chemically compatible with the other compositions. In one embodiment, the compositions (710) share some chemical characteristics, for example, and without limitation, isotopes of a particular chemical element or compound. The quantity of compositions (710) is a non-limiting value. In one embodiment, any number of compositions (710) is placed into the reservoir (708). As shown, compositions (710) are substantially stratified to define a plurality of layers (710a). The stratification allows or enables positioning of the layers (712a), (714a), (716a), (718a), and (720a) of the compositions (712), (714), (716), (718), and (720), respectively, in a predetermined order and with a predetermined height ($H_1$-$H_5$, respectively) in the reservoir, thereby positioning predetermined volumes of each of compositions (710) into the reservoir (708). The volume of the first composition (712) in the capillary tubes (734) is determined based on the height ($H_{CT}$) of the capillary tubes (734). In one embodiment, horizontal stratification, rather than the vertical stratification described above, is used. For example, the horizontal stratification may be enabled through the use of concentric chambers within the molten material reservoir (708).

Where strict separation of the five layers (710a) is required, an interface (712b), (714b), (716b), and (718b) is defined for each of the five layers (710a). Specifically, a first interface (712b) is defined between the first (712a) and second (714a) layers. Similarly, a second interface (714b) is defined between the second (714a) and third (716a) layers, a third interface (716b) is defined between the third (716a) and fourth (718b) layers, and a fourth interface is defined (718b) between the fourth (718a) and fifth (720a) layers. The compositional mixing between the layers (710a) at the interfaces (712b), (714b), (716b), and (718b) is minimized to provide for a rapid transition between the compositions (710) to impart the desired tailored properties to the fabricated objects (578). In one embodiment, some mixing of the compositions (710) at their interfaces (712b), (714b), (716b), and (718b) is engineered into the electrospray deposition process. For example, certain fabricated objects (578) require a graduated transition from a first composition to the subsequent composition. Therefore, one or more of the interfaces (712b), (714b), (716b), and (718b) are engineered to include a blended mix of the two adjacent compositions. Accordingly, fabricating the objects (578) with tailored properties with abrupt or gradual transitions is enabled.

Grain Growth Inhibition and Pinning

At least some existing tools for creating 3D electronic nano-structures employ, for example, electron-beam and ion-beam decomposition of chemical vapor precursors. These beam-writing techniques suffer from the drawbacks of time required for serial time-consuming steps to charge the surface as well as etching and lift-off procedures, the potential of contamination of precursor gases, and an inherently small number of materials that can be deposited. Additional methods include inert gas condensation (IGC) and other nano-powder production methods coupled with techniques directed toward proper material consolidation. At least one production deficiency with respect to nano-powder production methods is the grain growth induced through the heat and pressure applied during powder consolidation, which causes materials to lose their nano-characteristics and creates excessive porosity within the fabricated object. Similarly, at least some existing techniques designed for nano-scale fabrication include known methods for fabricating objects less than 100 nm in size. Some of these methods include photolithography, electron-beam lithography, atomic force microscopy (AFM), direct writing of liquids, (e.g., dip pen nano-lithography), and scanning tunneling microscopy (STM) writing of oxides. These fabrication methods have limitations directed to slow speeds and a constraint to two-dimensional (2D) structures.

Figure 9:
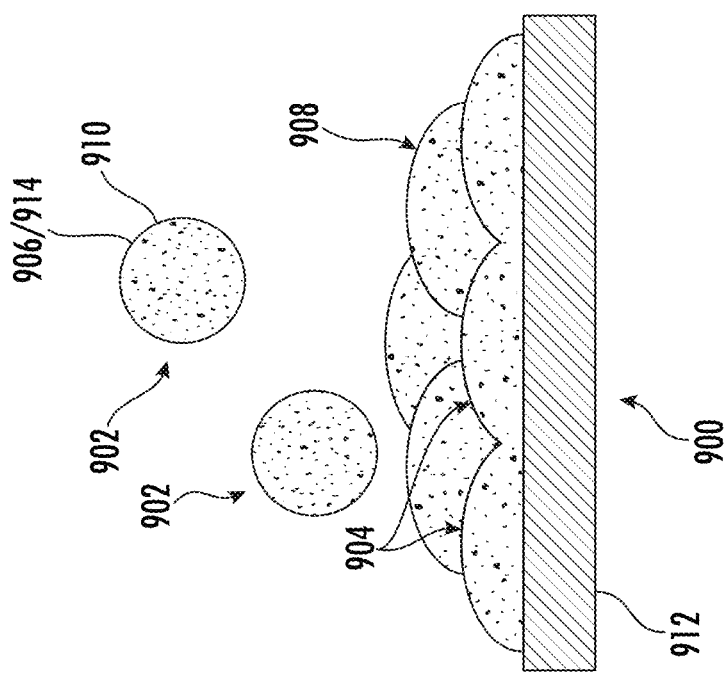
FIG. 9 depicts a schematic view of electrosprayed droplets on a substrate.
Figure 8:
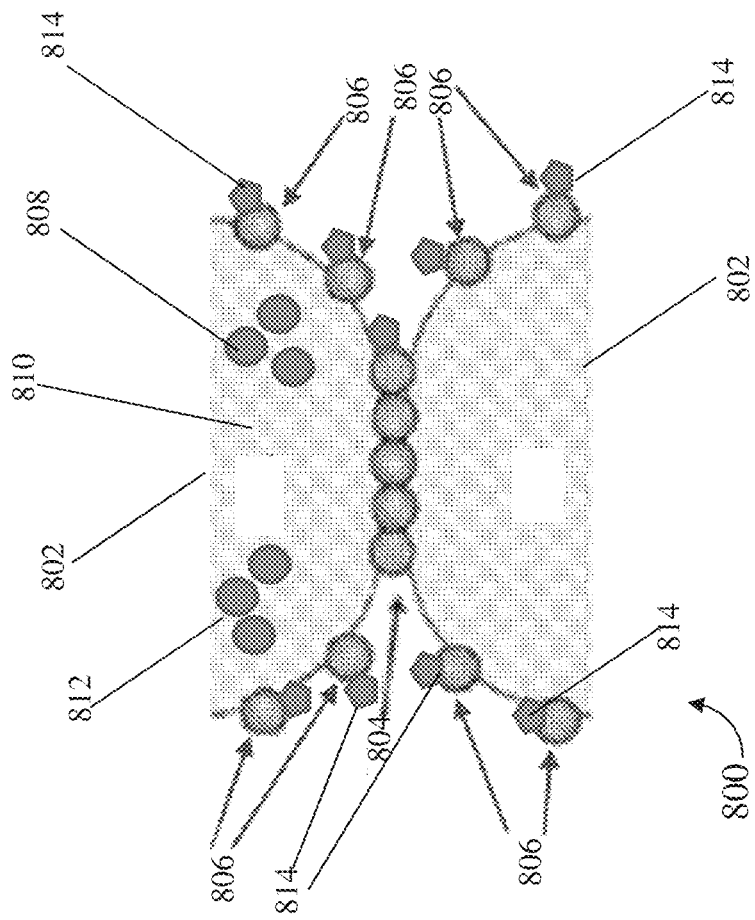
FIG. 8 depicts a schematic view of electrosprayed droplets and bridging monolayers formed by grain growth inhibitor nano-particles.

Referring to FIG. 8, a diagram (800) is provided illustrating electrosprayed droplets (802) and associated bridging monolayers (804) formed by grain growth inhibitor nano-particles (806). Also, referring to FIG. 9, a diagram (900) is provided illustrating electrosprayed droplets (902) on a substrate (912). As molten compositions (710) transit through the electrospray nozzle(s) (730), the compositions (710) are subjected to an electrical sheer stress due to the electric potential on the nozzle(s) (730) induced through the electric field generated by the extractor electrode plate (736). The induced sheer stress transforms a stream (not shown) of molten compositions (710) into one or more streams of electrosprayed droplets (746). In the illustrated embodiment, the electrospray nozzle (730) is similar to the electrospray nozzle (630). As the stream of electrosprayed droplets (346,446) or the plurality of streams of electrosprayed droplets (646,746) are directed toward the substrate (912), the droplets (802,902) travel from the electrospray nozzle(s) (730) to the substrate (912). As the nano-sized droplets (802) are expelled from the electrospray nozzle (730), surface tension of the molten material (710) induces a spherical shape to the droplets (802). In one embodiment, the object holder (254) on the stage (542) positions a fabricated object (578) that results from the electrospray process. Initially, the object holder (254) holds the substrate (912) of the fabricated object (578) onto which the electrosprayed stream(s) of droplets (746) are deposited. In some embodiments, the substrate (912) is the object holder (254).

In the illustrated embodiment, the droplets (802,902) include one of the compositions (712), (714), (716), (718), and (720) that each include one or more constituents. As shown, the constituents of the compositions (710) include nano-structural materials in the form of nano-particles (808) and the grain growth inhibitor nano-particles, shown in FIG. 8 at (806) and FIG. 9 at (906). The droplets (802) and (902) also include an engineered solute (810), including one or more first engineered solute materials (not shown). Alternatively, or in addition to the solute (810), the droplets (802) and (902) include a plurality of engineered nano-particles (812), including one or more engineered nano-particle materials. Also, one or more binding/wetting agents (910) different from the solute (810) are included in the droplets (802) and (902). In some embodiments, other materials are added. As illustrated, the constituents of the electrosprayed droplets (802) and (902) are heterogeneously dispersed. A heterogeneous mixture of the constituents within the compositions (710) includes the relative concentrations of the constituents varying throughout the compositions (710), and therefore the droplets (802) and (902). However, the constituents of the droplets (802) and (902) may also be homogeneously dispersed. A homogeneous mixture of the constituents within the compositions (710) includes the relative concentrations of the constituents substantially constant throughout the compositions (710), and therefore the droplets (802) and (902).

As the electrosprayed droplets (802) travel, grain growth inhibitor particles (806) overcome a surface tension induced on the droplets (802) and migrate to the surface boundaries of the droplets (802) to start forming bridging monolayers (804) that bond with neighboring droplets (802). When the droplets (902) impact on the substrate (912) and turn into a splat (908), the grain growth inhibitor particles (906) finish forming bridging monolayers (904). The bridging monolayers (904) limit grain growth of other particles to within the splat (908), thereby preserving the nano-characteristics of the fabricated object (578). Accordingly, the dynamics of the droplets (802) and (902) as they traverse the distance from the electrospray nozzle (730) to the target surface are leveraged to form the fabricated objects (578).

Nano-structural materials (808) suitable for use as a constituent in the nano-scale electrospray deposition apparatus (182), (200), (300), (400), (500), (600), and (700) described herein include metal, metal alloys, metal ceramics, (especially metal carbides, and metal nitrides), inter-metallics, ceramics, and ceramic-ceramic composites. More particularly, the nano-structural materials (808) include one or more of the following materials: Cu, FeCu, FeCo, MoSi, MoC, NbC, NiCr, TiC, NiAl, $Mo_2Si$, $NiCr/Cr_3C_2$, Fe/TiC, Mo/TiC, WC/Co, or any of the forgoing alloys with one or more of Ti, TiC, Mn, W, B, Y, Cr, Mo, Ni, Zr, Ce, Fe, Al, Si, V, and mixtures of the foregoing metals.

The grain growth inhibitors (806) and (906) are nano-grain pinning compounds that are used to pin the nano-grain structure through restricting grain growth thereof, thereby stabilizing the nano-grain structures and boundaries formed therewith. The grain growth inhibitors (806) and (906) may be modified through being heat-treated, reacted, reduced by chemical means, carburized, or nitrided to convert or partially convert the grain growth inhibitor (806) and (906) to induce the desired nano-grain boundary stabilization. In one embodiment, the grain growth inhibitors (806) and (906) are incorporated into a mixture of nano-structural materials (808) or precursors of nano-structural materials along with the binding/wetting agents (910) prior to admission into the material supply bin (102). In one embodiment, the nano-structural materials (808) and the grain growth inhibitors (806) and (906) are added separately to a solution with the wetting/binding agent (910). In one embodiment, the binding/wetting agent (910) and the grain growth inhibitors (806) and (808) are the same material, but with the binding/wetting agent (910) in a liquid phase and the nano-grain pinning compound in a solid particulate phase. In one embodiment, the binding/wetting agent (910), such as, but not limited to, the aluminum (Al) and titanium (W) solutes (810), are used to generate the gradient alloys, and the grain growth inhibitors (806) and (808) are different materials. The aluminum (Al) and titanium (W) may be referred to as binding/wetting agent precursors. Regardless of the mechanism for delivery, the electrospray deposition of monodispersed nano-droplets as described herein enables the uniform distribution of the grain growth pinning agents throughout the nano-structured materials.

The grain growth inhibitors suitable for use in the nano-scale electrospray deposition apparatus described herein are preferably chemically inert, amenable to uniform distribution onto or at the grain boundaries of the nano-structural material (808), and do not subtract substantially from the chemical, physical, and mechanical properties desired in the nano-structures formed therefrom. Grain growth inhibitors (806) and (906) suitable for use as a constituent in the compositions (710) for use with the nano-scale electrospray deposition apparatus (182), (200), (300), (400), (500), (600), (700) described herein include metal, metal alloys, metal ceramics, (especially metal carbides, and metal nitrides), inter-metallics, ceramics, and ceramic-ceramic composites. More particularly, the grain growth inhibitors (806) and (906) are materials including: B, Si, Al, Cr, Ni, Mo, Hf, Ta, Fe, W, Zr, Ce, Ti, Mo, TiC, AlSi, TiSi, TiAl, and $TiB_2$, and a combination thereof. In addition, materials such as rare earth metals, silicon-based carbides, titanium-based carbides, aluminum-based nitrides, titanium-based nitrides, BN, metal silicides, and metal aluminides may be used.

Table 1 provides a partial list of engineered (or tailoring) solutes (810) and the associated melting points. The aluminum and the titanium alloys may also be used as the raw materials (108) and binding/wetting agent (910) precursors.

TABLE 1

| List of Engineered Binding/ Wetting Agents and Solutes | Melting Point (° C.) |
|---|---|
| Aluminum | 660 |
| Titanium Nickel Copper Brazing Alloys | 668 |
| Magnesium Nickel Alloys | 507 |
| Brass | 905 |
| Iron Antimony Alloy | 748 |
| Nickel Zinc Alloy | 875 |
| Bronze (Manganese) | 865 |

Table 2 provides a partial list of tailoring nano-particles (812) and the associated melting points.

TABLE 2

| Nano-particle | Melting Temperature (° C.) |
|---|---|
| Titanium-Carbide (TiC) | 3160 |
| Tungsten Carbide (WC) | 2870 |
| Boron Carbide (BC) | 2763 |
| Boron Nitride (BN) | 2973 |
| Molybdenum Carbide (MoC) | 2577 |
| Silicon Nitride (SiN) | 1900 |
| Tantalum Carbide (TaC) | 3880 |

Deposition of an electrosprayed droplet (802) and (902) follows a three-stage sequence. The first stage of the sequence is an impact stage which occurs within approximately 21 milliseconds (msec) after ejection of the droplet (802) and (902) from the nozzle (730). The velocity of the droplets (802) and (902) is approximately 1.0026 m/s and the standoff distance (380) is approximately 2 mm. Within the range of 0 microseconds (μsec) to approximately 20 μsec upon commencement of impact, the droplet (802) and (902) contacts the heated substrate (912) at a temperature of approximately 500° C. (932° F.). The droplet (802) and (902) deforms from a spherical shape toward a liquid disk shape reaching a maximum spread diameter. As the droplets (802) and (902) fall from the electrospray nozzle (730), they rapidly cool and reach a selected viscosity and temperature to attach to the substrate (912) or fabricated object (578) while simultaneously having the grain growth inhibiting materials (806) migrate to the boundary of the droplet (802).

The second stage is a recoil stage which occurs within approximately 20 µsec to approximately 45 µsec upon commencement of the impact. The droplet (802) and (902) begins to recoil from the liquid disk shape toward the spherical shape. However, as the kinetic energy of the droplets (802) and (902) dissipates at least partially due to the surface tension of the droplets (802) and (902), an oscillation of the shape of the droplets (802) and (902) occurs until the droplets (802) and (902) attains a static, flattened shape. The oscillation of the droplets (802) and (902) after impact and during recoil is minimized due to the small size of the droplets (802) and (902).

The third stage is a quasi-steady solidification stage which occurs more than approximately 45 µsec upon commencement of the impact during which the now immobile droplet (802) and (902) retains its flattened shape, described as a splat (908). The splat (908) shrinks as the droplet (802,902) temperature decreases, thereby inducing a mechanical stress therein. This stress is alleviated by maintaining the substrate (912) below a known recrystallization temperature such that the splats (908) diffuse together. If the stress is not alleviated, micro-cracking of the substrate (912) may occur.

Some existing nano-powder production techniques for 3D fabrication of nano-scale objects require some method of sintering. These techniques include stereolithography, inert gas condensation, laser vaporization, spark erosion, electro-explosion of wires, and microwave plasma techniques. Sintering can induce creep, warpage, and grain growth in the objects being manufactured. Accordingly, the desired nano-characteristics of the nano-structure are lost during the sintering process.

As the droplets (802) and (902) are deposited, the droplets (902) are brought into contact with each other, thereby facilitating a significant reduction in a porosity of the associated layer on the substrate (912). The splats (908) form bonded-nano-agglomerates on the substrate (912) while maintaining their flattened shape. When exposed to the electrospray conditions, binder precursors, e.g., the aluminum (Al) and titanium (W) that generate the gradient alloys, within the droplets (802) and (902) form crystals e.g. (814) and (914). These crystals (814) and (914) coat the grain growth inhibitor nano-particles (806) and (906), respectively, within the droplets (902) and form connections between the nano-grains that fill gaps between adjacent nano-particles. In addition, controlling the cooling rate and charge on the droplets (802) and (902) further enables the electrosprayed depositions to fill any voids within the layers formed on the substrate (912), thereby further decreasing the porosity of the fabricated object (578). Notably, the charge on the solidifying splats (908) enables covalent bonding of the splats (908) to the neighboring depositions, i.e., the underlying splats (908) to form a uniform nano-structure. Therefore, a combined covalent-metallic-ionic type of chemical bonding created in the electrosprayed depositions eliminates the need for post-fabrication sintering to compact the deposited materials and remove any porosities. Accordingly, the robustness of the material integrity of the fabricated object (578) is improved through the methods of temperature control of the droplets (802) and (902) for a particular composition through flow control of the molten material (410) as described with respect to FIG. 4. The robustness of the material integrity is also attained through maintenance of the temperature inside the enclosure cavity (462), and maintaining the deposited material below the recrystallization temperature as described in association with FIG. 4.

Referring again to FIG. 7, the first composition (712) includes a first nano-structural material (808) and a plurality of first grain growth inhibitor nano-particles (806) and (906) including one or more first grain growth inhibitors. The first composition (712) also includes a first engineered solute (810) including one or more first engineered solute materials (not shown). Alternatively, or in addition to, the solute materials, the first composition (712) includes a plurality of second engineered nano-particles (812) including one or more first engineered nano-particle materials (not shown).

The second composition (714) includes a second nano-structural material (808) and a plurality of second grain growth inhibitor nano-particles (806) and (906) including one or more second grain growth inhibitors. The second composition (714) also includes a second engineered solute (810) including one or more second engineered solute materials (not shown). Alternatively, or in addition to the solute materials, the second composition (714) includes a plurality of second engineered particles (812) including one or more second engineered nano-particle materials (not shown).

Similarly, the third, fourth, and fifth compositions (716), (718), and (720) include third, fourth, and fifth nano-structural materials (808), respectively. The third, fourth, and fifth compositions (716), (718), and (720) also include a plurality of third, fourth, and fifth grain growth inhibitor nano-particles (806) and (906), respectively. The grain growth inhibitor nano-particles (806) and (906) include one or more third, fourth, and fifth grain growth inhibitors, respectively (not shown). The third, fourth, and fifth compositions (716), (718), and (720) also include at least one of a third, fourth, and fifth engineered solute (810), respectively, including one or more third, fourth, and fifth engineered solute materials, respectively (not shown). Alternatively, or in addition to the solute materials, the third, fourth, and fifth compositions (716), (718), and (720) include a plurality of third, fourth, and fifth engineered nano-particles (812), respectively, including one or more third, fourth, and fifth engineered nano-particle materials, respectively (not shown).

The compositions (710) include predetermined and configurable nano-structural materials (808). As used herein, the nano-structural materials (808) include materials that have a microstructure with a characteristic length scale of which is on the order of approximately 1 nm to approximately 10 nm. The nano-structural materials (808) are engineered to fabricate object structures with predetermined and configurable mechanical properties that include, without limitation, stiffness, strength, ductility, hardness, and toughness. The nano-structural materials (808) are also engineered to provide predetermined and configurable physical properties that include, without limitation, density, electrical conductivity, and thermal conductivity. In addition, the nano-structural materials (808) are engineered to provide predetermined and configurable chemical properties that include, without limitation, corrosion resistance. The nano-structural materials (808) are further engineered to provide predetermined and configurable manufacturing properties including, without limitation, formability, machinability, and ease of joining with other objects. Accordingly, the nano-structural materials (808) are selected based on their engineered and inherent mechanical, physical, electrical, and manufacturing properties to produce a fabricated object (578) with the desired functional properties.

The compositions (710) also include predetermined and configurable grain growth inhibitor nano-particles. In one embodiment, each of the compositions (710) has a single species of grain growth inhibitor nano-particles therein corresponding to a single species of grain growth inhibitor in nano-particle form. In one embodiment, at least one of the compositions (710) has more than one species of grain growth inhibitor nano-particles therein such that the associated compositions include more than one species of grain growth inhibitor in nano-particle form therein.

In addition to the nano-structural materials (808) and the grain growth inhibitors in nano-particle form, at least one or more of the compositions (710) includes at least one of an engineered solute (810) and engineered nano-particles (812). The engineered solutes (810) include one or more engineered solute materials in an engineered solution such that the associated precipitates provide engineered, i.e., tailored properties once they precipitate out of solution to assist in stabilizing the nano-grain structure of the deposited layers on the fabricated objects (578). In one embodiment, a portion of the precipitates migrate to the boundary while other portions of the precipitates migrate throughout the nano-grain structure thereby strengthening the nano-grain structure. In one embodiment, the precipitates are, for example, a material that has a higher melting temperature, e.g., see Table 2, than materials selected with a lower melting temperature, e.g., the titanium alloy in Table 1. The precipitates are nano-particle-sized, i.e., that have a microstructure with a characteristic length scale of which is on the order of approximately 1 nm to approximately 10 nm. In some embodiments, rather than, or in addition to, the engineered solutes (810) at least one or more of the compositions (710) include engineered nano-particles (812) therein. The engineered nano-particles (812) differ from the engineered precipitates in that the engineered nano-particles (812) are not dissolved in a solution and are added to the associated compositions in the form of a flowable solid with, or, in one embodiment, without, a flow enhancing liquid. See Table 1. The engineered nano-particles (812) include one or more engineered nano-particle materials therein. Accordingly, the engineered solute, (810) engineered solute materials, engineered nano-particles (812), and engineered nano-particle materials are selected or specifically manufactured to produce tailored nano-composites (in the form of engineered nano-particles (812)) that are then used to produce tailored nano-structures that in turn define tailored fabricated objects (578).

As used herein, the term "nano-structures" describes structures that are formed through the electrospray deposition process that have a microstructure with a characteristic length scale of which is on the order of approximately 1 nm to approximately 100 nm. The term "objects" as used herein describes those objects fabricated (578) through the electrospray deposition process that have a characteristic length scale greater than approximately 100 nm on which the nano-structures are formed. Such fabricated objects (578) include, without limitation, electrodes for nano-scale energy conversion devices, micro-devices and micro-tools for virtually any industry, and macroscopic devices and tools that are easily discernable with the unaided eye.

In addition to defining tailored nano-composites in the form of engineered nano-particles (812), as used herein the terms "engineered" and "tailored" indicate particular programmed, configured, or configurable properties and characteristics of the nano-structures produced through electrospray deposition of the nano-composite nano-particles produced through the electrospray deposition process. The engineered nano-structures include at least one of configured non-graduated properties and configured graduated properties. Non-limiting examples of configured non-graduated properties of a nano-structure include uniform color and uniform strength throughout the fabricated object (578).

Non-limiting examples of configured graduated nano-structure properties include graduated strength properties, and non-uniform electrical and thermal conductivities, where the graduated properties vary as a function of at least one physical dimension. The graduation of the properties is one of linear and non-linear. In addition, graduated properties include gradient alloys, where the material composition of the materials deposited on a substrate (not shown) through the electrospray process described herein varies as a function of at least one physical dimension. The graduated properties may include variations in a first property and a second property, where the first and second properties are either similar properties or different properties. In one embodiment, the variations of the properties are created through varying the concentrations of the constituents of the compositions, including, without limitation, removing one or more constituents and adding one or more constituents. Accordingly, engineered fabricated objects (578) manufactured through the electrospray deposition process described herein include particular tailored properties and characteristics that are either relatively uniform with respect to the three physical dimensions or vary with respect to one or more of the three physical dimensions.

Nano-Material (Layer) Deposition and Nano-Structure Formation

Figure 10:
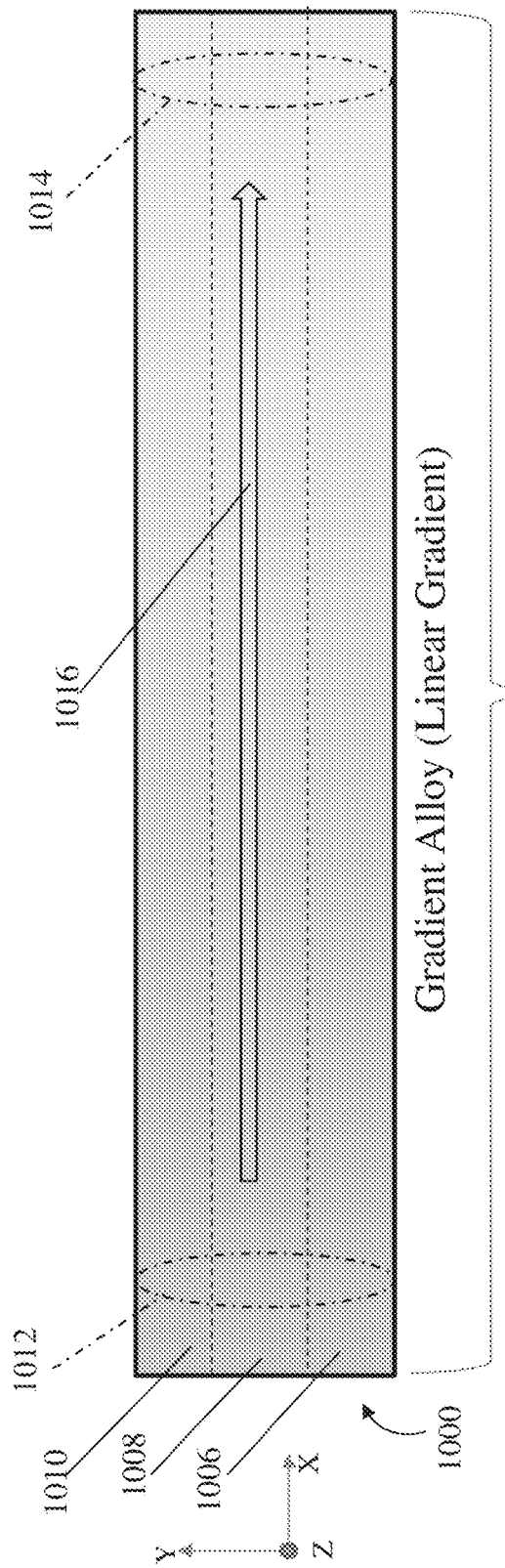
FIG. 10 depicts a schematic view of a gradient alloy with a linear gradient.

Referring to FIG. 10, a diagram (1000) is provided illustrating a gradient alloy (1002) with a linear gradient (1004). Three deposition layers (1006), (1008), and (1010) are shown, although this quantity of deposition layers is a non-limiting value. As shown, a first deposition layer (1006) is overlaid with a second deposition layer (1008) that is in turn overlaid with a third deposition layer (1010). The material composition of the layers (1006), (1008), and (1010) is substantially similar and each layer includes one or more constituents. In one embodiment, each layer (1006), (1008), and (1010) includes one or more different compositions that are deposited sequentially for each of layers (1006), (1008), and (1010). Each layer (1006), (1008), and (1010) extends approximately similar distances in the Y-dimension such that each of layers (1006), (1008), and (1010) has a similar thickness. In one embodiment, the three layers (1006), (1008), and (1010) have any dimensional values extending in three-dimensional space. A region (1012) with a higher value of a property is shown position in a region (1014) with a lower value of the property is shown in a different region from region (1014) where the value of the property decreases linearly along the X-axis in the direction of an arrow (1016). In one embodiment, the graduated nano-structures formed include one or more gradient alloys therein, where each of the gradient alloys defines one or more species of the graduated nano-structures with a material composition the varies with respect to at least one physical dimension. A non-exhaustive list of properties that may be varied includes constituent concentration, stiffness, strength, ductility, hardness, density, electrical conductivity, thermal conductivity, corrosion resistance, and machinability. While one property is shown linearly varying in one dimension in FIG. 10, in one embodiment the property is varied in multiple dimensions. In one embodiment, more than one property is varied in one or more dimensions. Accordingly, graduated nano-structures including gradient alloys with linear gradients are formed through the deposition of a plurality of layers as described herein.

Figure 11:
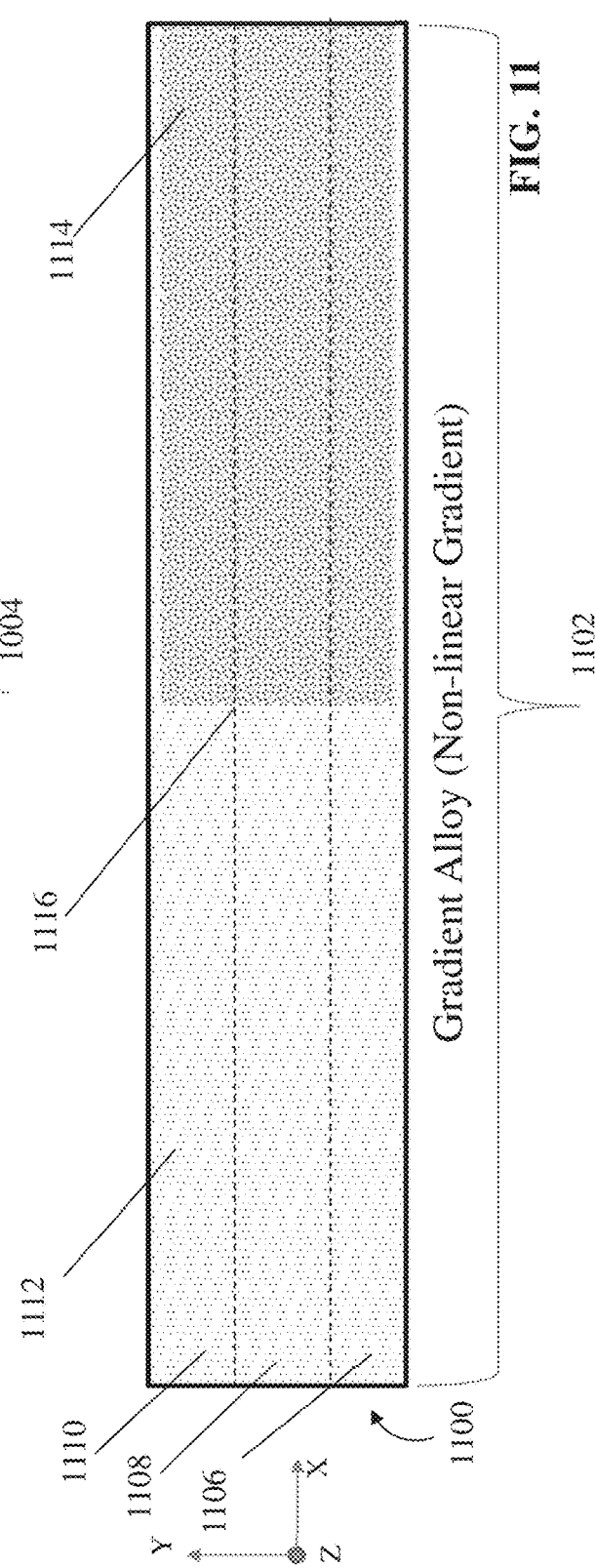
FIG. 11 depicts a schematic view of a gradient alloy with a non-linear gradient.

Referring to FIG. 11, a diagram (1100) is provided illustrating a gradient alloy (1102) with a non-linear gradient (1104). Three deposition layers (1106), (1108), and (1110) are shown, although the quantity of layers is a non-limiting value. As shown, a first deposition layer (1106) is overlaid with a second deposition layer (1108) that is in turn overlaid with a third deposition layer (1110). In addition, the material composition of the three layers (1106), (1108), and (1110) is substantially similar and each layer includes one or more constituents as described elsewhere herein. In one embodiment, each layer (1106), (1108), and (1110) includes one or more different compositions that are deposited sequentially for each of layers (1106), (1108), and (1110). In addition, as shown, each layer (1106), (1108), and (1110) extends approximately similar distances in the Y-dimension such that each of layers (1106), (1108), and (1110) has a similar thickness. In one embodiment, the layers (1106), (1108), and (1110) have any dimensional values extending in the three dimensions (X, Y, Z). A first region (1112) with a lower value of a property is shown in a first region (1114), e.g. to the left, with a higher value of the property is shown in another region, e.g. to the right, where the value of the property increases substantially instantaneously along the X-axis at an interface (1116). In one embodiment, the graduated nano-structures formed include one or more gradient alloys therein, where each of the gradient alloys defines one or more species of the graduated nano-structures with a material composition that varies with respect to at least one physical dimension. A non-exhaustive list of properties that may be varied includes constituent concentration, stiffness, strength, ductility, hardness, density, electrical conductivity, thermal conductivity, corrosion resistance, and machinability. While one property is shown varying in one dimension in FIG. 11, in one embodiment, the property is varied in multiple dimensions. In one embodiment, more than one property is varied in one or more dimensions. Accordingly, graduated nano-structures including gradient alloys with non-linear gradients are formed through the deposition of a plurality of layers as described herein.

Figure 12:
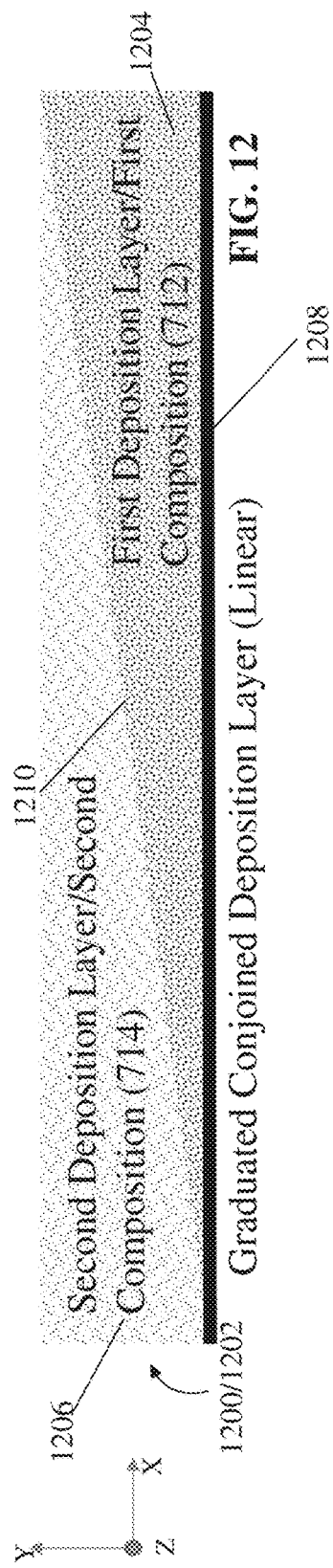
FIG. 12 depicts a schematic view of a linearly-graduated conjoined deposition layer.

Referring to FIG. 12, a diagram (1200) is provided illustrating a linearly-graduated conjoined deposition layer (1202). Also, referring to FIG. 7, in one embodiment, each of the compositions (710) is substantially homogeneous within the associated layers (710a) and each of the substantially homogeneous compositions (710) is dissimilar to each other. When the associated deposition layers are deposited on a substrate (1208) through nano-scale electrospray deposition apparatus (700), the layers form a graduated conjoined deposition layer (1202), where each layer (1204) and (1206) is substantially homogeneous. Specifically, a first deposition layer (1204) is deposited on a substrate that includes the first homogeneous composition (712) and a second deposition layer (1206) is deposited on at least a portion of the first deposition layer (1204), where the second deposition layer (1206) includes the second composition (714), e.g. a homogenous composition. The overall material composition of the graduated conjoined deposition layer (1202) varies with respect to at least one physical dimension. One non-limiting example includes the height (Y-dimension) of the layer (1206) above the substrate (1208) varying as a function of position along the length (X-dimension) of the substrate (1208), thereby forming the graduated conjoined deposition layer (1202) with a substantially linear interface (1210). In one embodiment, the graduated conjoined deposition layer (1202) may also vary in the width, e.g. the Z dimension, through proper deposition of the first homogeneous composition (712) and the second composition (714). In one embodiment, this process is extrapolated to all of the subsequent deposition layers deposited by the apparatus (700) such that each layer, or partial layer, varies from the previous and subsequent layers with respect to the assigned properties. In one embodiment, the first composition (712) and/or the second composition (714) are not homogeneous, and the first deposition layer (1204) and/or the second deposition layer (1206) deposited therefrom are also not homogeneous. In one embodiment, the graduated nano-structures formed include one or more of the graduated conjoined linear deposition layers (1202) therein, where each of the graduated deposition layers (1202) defines one or more species of the graduated nano-structures with a material composition that varies with respect to at least one physical dimension. Accordingly, by forming conjoined graduated deposition layers (1202), graduated nano-structures on fabricated objects (578) are formed.

Figure 13:
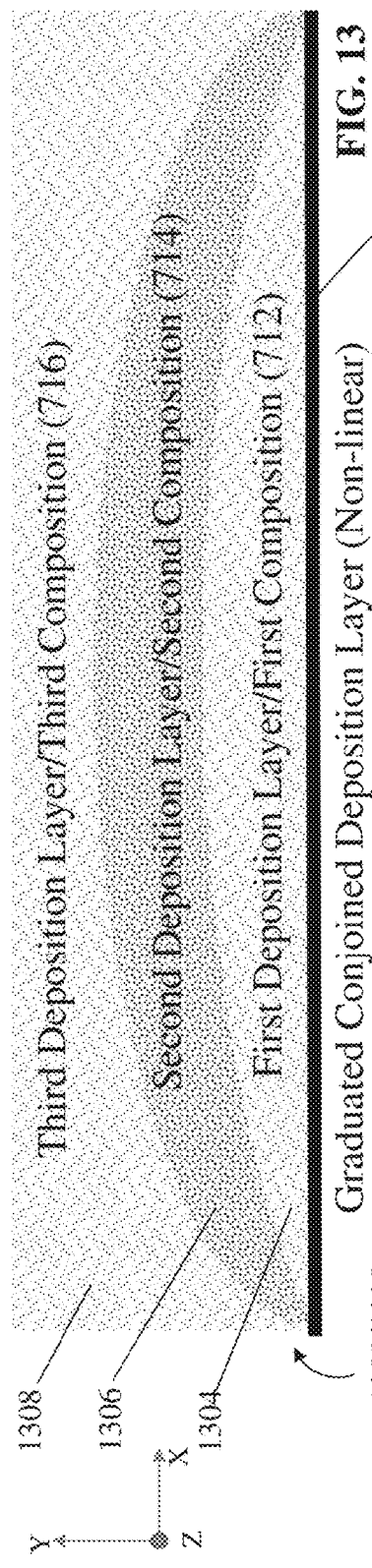
FIG. 13 depicts a schematic view of a non-linearly-graduated conjoined deposition layer.

Referring to FIG. 13, a diagram (1300) is provided illustrating a non-linearly-graduated conjoined deposition layer (1302). Also, referring to FIG. 7, for those embodiments where each of the substantially homogeneous compositions (710) is dissimilar to each other. When the associated deposition layers are deposited on a substrate (1308) through nano-scale electrospray deposition apparatus (700), the layers form a graduated conjoined deposition layer (1302), where each layer (1304), (1306), and (1308) is substantially homogeneous. A first deposition layer (1304) is deposited on a substrate (1310) that includes the first homogeneous composition (712), a second deposition layer (1306) is deposited on at least a portion of the first deposition layer (1304), where the second deposition layer (1306) includes the homogeneous second composition (714). A third deposition layer (1308) is deposited on at least a portion of the second deposition layer (1306), where the third deposition layer (1308) includes the homogeneous third composition (716). In one embodiment, the third deposition layer (1308) is also deposited on at least a portion of the first deposition layer (1304). The overall material composition of the graduated conjoined deposition layer (1302) varies with respect to at least one physical dimension. One non-limiting example includes the height (Y-dimension) of the second deposition layer (1306) varying above the substrate (1310) as a function of position in the length (X-dimension) along the substrate (1308), thereby forming the graduated conjoined deposition layer (1302). In one embodiment, the graduated conjoined deposition layer (1302) may also vary in the width (Z-dimension) through proper deposition of the first homogeneous composition (712), the second composition (714), and the third composition (716). In one embodiment, this process is extrapolated to all of the deposition layers deposited by the apparatus (700) such that each layer, or partial layer, varies from the previous and subsequent layers with respect to the assigned properties. In one embodiment, the first composition (712) and/or the second composition (714) and/or the third composition (716) are not homogeneous, and the first deposition layer (1304) and/or the second deposition layer (1306) and/or the third deposition layer (1308) are also not homogeneous. In one embodiment, the graduated nano-structures formed include one or more of the graduated conjoined non-linear deposition layers (1302) therein, where each of the graduated deposition layers (1302) defines one or more species of the graduated nano-structures with a material composition that varies with respect to at least one physical dimension. Accordingly, by forming conjoined graduated deposition layers (1302), graduated nano-structures on fabricated objects (578) are formed.

Figure 14:
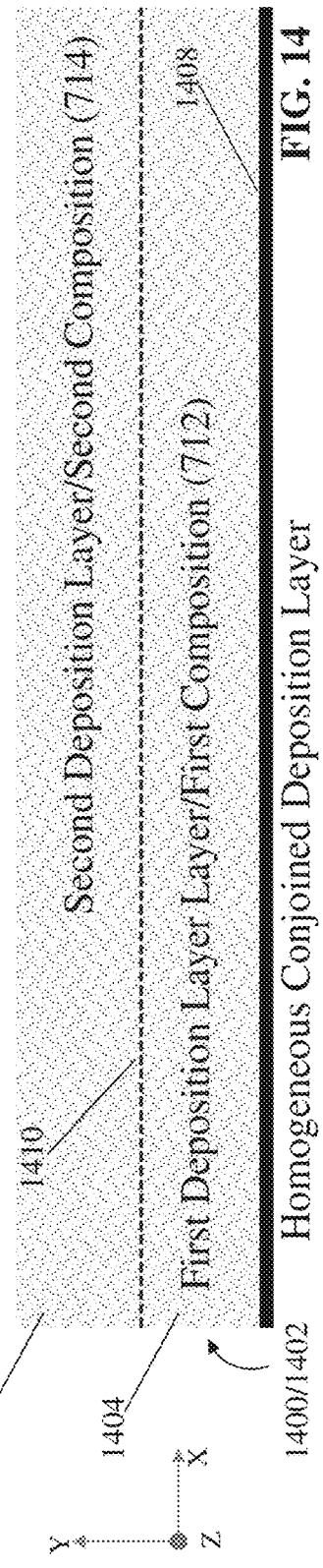
FIG. 14 depicts a schematic view of a homogeneous conjoined deposition layer.

Referring to FIG. 14, a diagram (1400) is provided illustrating a homogeneous conjoined deposition layer (1402). In one embodiment, referring to FIG. 7, each of the substantially homogeneous compositions (710) is dissimilar to each other. When the associated deposition layers are deposited on a substrate (1408) through nano-scale electrospray deposition apparatus (700), the layers form a homogeneous conjoined deposition layer (1402), where each layer (1404) and (1406) is substantially homogeneous. A first deposition layer (1402) is deposited on a substrate (1408) that includes the first homogeneous composition (712) and a second deposition layer (1406) is deposited on at least a portion of the first deposition layer (1404), where the second deposition layer (1406) includes the homogeneous second composition (714). One non-limiting example includes the material composition of the two layers (1404) and (1406) being substantially uniform with respect to the height (Y) above the substrate (1408), and the length (X) and width (Z) dimensions of the two layers (1404) and (1406) along the substrate (1408), thereby forming the homogeneous conjoined deposition layer (1402) with an interface (1410). As shown, the interface (1410) is substantially parallel to the X-axis. In one embodiment, the interface (1410) is formed with any orientation that enables operation of apparatus (700) as described herein. In one embodiment, this process is extrapolated to all of the deposition layers deposited by apparatus (700) such that each layer, or partial layer, deposited by apparatus (700) is substantially similar to the previous and subsequent layers with respect to the assigned properties. In one embodiment, the graduated nano-structures formed include one or more homogeneous conjoined deposition layers (1402) therein, where each of the deposition layers (1402) defines one or more species of the graduated nano-structures with a material composition that is substantially constant with respect to at least one physical dimension. Accordingly, by forming homogeneous conjoined deposition layers (1402), substantially homogeneous nano-structures on fabricated objects (578) are formed.

In one embodiment, at least one of the layers (710a) of the compositions (710) includes a blend of one or more nano-structural materials (808). In one embodiment, the blend within the associated layer (710a) is one of a homogeneous blend, a heterogeneous blend, or a combination thereof. In one embodiment, the nano-structural material nano-particles (808) may have one or more of the following characteristics: insulating, conductive, and semi-conductive nano-particles, to provide for the predetermined and configured electrical conductivity within a portion or the entirety of fabricated objects (578). The homogeneous blend of a plurality of nano-structural materials (808) includes the various nano-structural materials (808) substantially homogeneously dispersed throughout the associated layer (710a). A layer deposited by the electrospray apparatus (700) includes the various nano-structural materials (808) substantially homogeneously dispersed throughout the deposited layer. One non-limiting method for producing such a blend includes mixing the desired blend of nano-structural materials (808) as raw materials (108) prior to insertion into the material supply bin (102). For example, in one embodiment, the blending follows the magnetic field flux lines. Accordingly, the homogenous blending of a plurality of nano-structural materials (808) within one or more of the compositions (710) provides for positioning substantially uniform layers of deposited materials on fabricated objects (578) manufactured with electrospray apparatus (700).

In one embodiment, a heterogeneous blend of a plurality of nano-structural materials (808) includes the various nano-structural materials (808) substantially heterogeneously dispersed throughout the associated layer (710a). A layer deposited by the electrospray apparatus (700) includes the various nano-structural materials (808) substantially heterogeneously dispersed throughout the deposited layer. Such heterogeneous dispersal of the blend of nano-structural materials (808) provides for positioning graduated properties throughout predetermined portions of the associated layers deposited through electrospray apparatus (700). One non-limiting method for producing the heterogeneous blends of nano-structural materials (808) includes adding an agglomerating additive to a mixture of raw materials (108) prior to insertion into the material supply bin (102). Accordingly, the heterogeneous blending of a plurality of nano-structural materials (808) within one or more of the compositions provides for positioning graduated properties within predetermined portions of the layers of deposited materials on fabricated objects (578) manufactured with electrospray apparatus (700).

In one embodiment, one or more of the layers (710a) of the compositions (710) is formed by a plurality of sublayers (not shown), where one or more of the sublayers includes a homogeneous blend of a plurality of nano-structural materials (808) and one or more sublayers includes a heterogeneous blend of a plurality of nano-structural materials (808). Extrapolating the combination of heterogeneous and homogeneous blends to more than one layer (710a) of the compositions (710) results in a plurality of deposition layers that impart a plurality of homogeneous portions and heterogeneous portions the fabricated objects (578). Accordingly, the combination of heterogeneous and homogeneous sublayers in the molten material reservoir (708) provides for fabricating objects (578) with homogeneous properties in portions of a layer deposited through the electrospray apparatus (700) and heterogeneous properties in other portions of the deposited layer, thereby forming fabricated object (578) with uniform properties and graduated properties in predetermined portions therein.

In some embodiments, as described above, the blend of a plurality of nano-structural materials (808) within one or more of the compositions (710) enables fabrication of objects (578) with at least portions thereof defining graduated properties. In addition, in some embodiments, the relative concentrations of the nano-structural materials (808) in the blends are also varied to define the graduated properties. In one embodiment, one or more of a plurality of the grain growth inhibitors, a plurality of the engineered solute materials, and a plurality of engineered nano-particle materials are blended either in addition to, or in place of, blending the nano-structural materials (808). The blends of the grain growth inhibitors, the engineered solute materials, and the engineered nano-particle materials are also one of heterogeneous, homogeneous, and a combination thereof. Accordingly, the engineered properties of the fabricated objects (578) are further enabled through regulating the concentrations one or more of the grain growth inhibitors, the engineered solute materials, and the engineered nano-particle materials.

Temperature control of the droplets (746) throughout the deposition process is given great consideration. In one embodiment, each of the compositions (710) requires different temperature conditions. Accordingly, the apparatus and methods for controlling temperature of the droplets (746) as described herein are scalable and adaptable for each of the compositions (710).

In one embodiment, in addition to the predetermined placement of engineered nano-structural materials (808) to form tailored nano-structures on the fabricated objects (578), sacrificial materials (not shown) are included in one or more of the molten compositions (710). The one or more compositions (710) as deposited on the fabricated object (578) are altered to include the sacrificial material that is removed later to further shape the fabricated objects (578). In one embodiment, acetone is used to remove the sacrificial material. Accordingly, any three-dimensional (3D) design can be manufactured without post-fabrication machining, including the design circumstance when one of the various material depositions needs to be subtracted to create unusual 3-D shapes.

Referring to FIG. 7., the nano-scale electrospray deposition apparatus (700) includes a plurality of electrospray nozzles (730) arranged in an array within a manifold (732). As shown, the nozzles (730) are linearly arranged. In one embodiment, the nozzle arrangement is in the direction of the X-axis. In one embodiment, the electrospray nozzles (730) are arranged in any configuration that enables the rapid fabrication aspects as described herein, i.e., any number of nozzles (730) are arranged in any configuration with respect to the X-axis and the Z-axis. In one embodiment, the nozzles (730) are arranged as one or more primary nozzles (shown as nozzles (730)) and a plurality of secondary nozzles (780) operatively coupled to an associated secondary manifold (782), where the object holder (754) includes the surface ($754_{Surface}$) defining the lateral plane ($754_{Plane}$), where the plurality of secondary nozzles (780) are oriented within an arcuate orientation extending about the lateral plane ($754_{Plane}$). Each secondary nozzle (780) directs a stream of secondary spray droplets (784) toward the surface ($754_{Surface}$). In the illustrated embodiment, one manifold (782) and three secondary nozzles (780) are shown, where the numbers of manifolds (782) and secondary nozzle (780) are non-limiting. In one embodiment, the secondary nozzles (780) are oriented orthogonally with respect to the lateral plane ($754_{Plane}$). In one embodiment, the secondary nozzles (780) are oriented non-orthogonally with respect to the lateral plane ($754_{Plane}$). In one embodiment, the secondary manifold (782) is coupled to the manifold (732). In one embodiment, the secondary manifold (782) is coupled to a separate material source (not shown). In one embodiment, the nozzles (730) may also be arranged in the direction of the Y-axis. However, the restrictions as described elsewhere herein with respect to temperature control of the electrospray droplets (746) and the stage (242) and (442) are factors to be considered in the arrangement of the nozzles (730). In one embodiment, rather than a single orifice (240) and (340), the capillary tubes (734) include a coating or patterning head (not shown) with one or more orifices (not shown) or nozzles (not shown) as depositing nozzles for producing a very uniform film or patterns on fabricated objects (578). The patterning head is proximate the extractor electrode plate (736) with a single or a plurality of conductive capillary orifices arranged singularly or in two or more rows within the manifold (732). In one embodiment, the end position, e.g. tips, of the orifices or nozzles are placed below the lateral plane ($754_{Plane}$) of the object holder (754). In one embodiment, the orifices or nozzles are positioned above or parallel to the lateral plane ($754_{Plane}$). In one embodiment where the orifices or nozzles are electrically conductive, the orifice(s) or nozzle(s) is coated with an insulative coating (not shown). In one embodiment where the orifice(s) or nozzle(s) is fabricated with a dielectric material, the orifice or nozzle is coated with a conductive coating (not shown). Accordingly, any number of, and any configuration of, the nozzles (730) and (780) that enables operation of nano-scale electrospray deposition apparatus (700) as described herein are used.

The deposition patterns of the streams of droplets (746) on the object (578) are controlled through the flow rate of the compositions (710) through the array of electrospray nozzles (730). The flow rate is also controlled through the alignment of the nozzles (730) with respect to the object (578) through positioning of the stage (242) and (442). The flow rate is further controlled through alignment of the streams of droplets (746) through regulation of the electric and magnetic fields generated by the combined extractor/inductive plate (736). During the electrospray process, the rate of deposition through individual nozzles (746) is controlled through modulation of the associated valves (774). In one embodiment, portions of the object (578) will receive varying rates of material deposition thereon, thereby further enhancing delivery of tailored properties to the object (578). Regulation of the materials' depositions on the object (578) for each of the compositions (710) is similarly conducted. For some compositions (710), the deposition thereof on the object (578) may be selective with respect to the portion of the object (578) that receives the droplets (746). Accordingly, deposition of the compositions (710) through modulation of the plurality of streams of droplets (746) through the plurality of electrospray nozzles (730) and selective alignment of the stage (242) and (442) with the nozzles (730) provides for the formation of compositional gradients on the object (578).

The nano-scale electrospray deposition apparatus (182), (200), (300), (400), (500), (600), and (700) include a main control unit (584). The main control unit (584) is implemented in programmable hardware devices such as field programmable gate arrays (FPGAs), programmable logic devices, i.e., programmable logic controllers (PLCs), and distributed processing systems (DCSs), or the like. The main control unit (584) includes sufficient hardware devices, including, without limitation, processor units, memory devices, and storage devices to enable the functionality and execute the methods as described herein. In addition, the main control unit (584) will includes sufficient software to enable the functionality and execute the methods as described herein. Moreover, the main control unit (584) is operatively and communicatively coupled to the associated measurement and control devices through sufficient communications channels, either through wires and cables, or wirelessly, to enable the functionality and execute the methods as described herein. Accordingly, any combination of hardware and software that enables operation of the nano-scale electrospray deposition apparatus (182), (200), (300), (400), (500), (600), and (700) as described herein is used.

Referring to FIGS. 5 and 7, deposition of the layers (1006)-(1010), (1106)-(1110), (1204)-(1206), (1304)-(1308), and (1404)-(1406), hereon referred to collectively as the deposition layers, is controlled through the main control unit (584) that uses profile data collected from the first profilometer (582) and the a second optical profilometer (588) to control the electrospray apparatus (182), (200), (300), (400), (500), (600), and (700), hereon collectively referred to as the nano-scale electrospray deposition apparatus, during deposition of the deposition layers. The optical profilometers (582) and (588) measure the distance to the fabricated object (578) from the profilometers (572) and (588) at specific time intervals to create profile data of the fabricated object (578) as the stage (542) moves the fabricated object (578) with respect to the electrospray nozzles (530) and (730). For deposition of the subsequent deposition layer, the main control unit (584) directs the stage (542) to move vertically as necessary to maintain the measured stand-off distance (380) at the target stand-off distance, based on the profile data of the proceeding deposition layer. The main control unit (584) also uses the profile data to compensate for errors in the previous deposition layers. If the profile data of the proceeding deposition layer indicates that some region of the fabricated object (578) is too thick, the main control unit (584) can correct on a subsequent or adjacently positioned deposition layer by slowing the flow rate of molten material (510) and (710) through the electrospray nozzle(s) (530) and (730) when over the associated region of the fabricated object (578). Likewise, if the profile data of the proceeding deposition layer indicates that some region of the fabricated object (578) is too thin, the main control unit (584) can correct for the thickness error on the subsequent or adjacently positioned deposition layer by increasing the flow rate of molten material (510) and (710) through the electrospray nozzle(s) (530) and (730) when over the associated region of the fabricated object (578). The main control unit (584) controls the flow rate of the molten material (510) and (710) through using the valve(s) (374) and (774), changing the pressure of the gas in the reservoir (508) and (708) or changing the electrical conditions of the extractor electrodes (536) and (736).

Referring to FIG. 7, the main control unit (584) controls the positioning of the stage (542) to selectively align the substrate (912,1208,1310,1408) and/or the fabricated object (578) with the predetermined nozzles of the array of electrospray nozzle (730) to deposit the compositions (710) through predetermined initiation and cessation of the streams of droplets (746). In one embodiment, the first composition (712) is extracted from the molten material reservoir (708) and deposited on the fabricated object (578) in a predetermined sequence of nozzle (730) activation and stage (542) positioning until the first composition (712) is exhausted. The main control unit (584) then sequentially deposits the second, third, fourth, and fifth compositions (714), (716), (718), (720), respectively, to form one or more of the compositional gradients, gradient alloys, and graduated nano-structures described elsewhere herein.

In one embodiment, a computer program product having program code is resident within the main control unit (584) or resident in a networked computer component operatively coupled to the main control unit (584). The program code includes sufficient program instructions to deposit the deposition layers on the substrate (912) or the fabricated object (578) such that the deposited layers create an object configuration having the one or more predetermined object configuration characteristics. In one embodiment, fabricated objects (578) are manufactured through a computer assisted design (CAD) software program resident within the main control unit (584) to guide the stage (542) and initiate or terminate the deposition of selected compositions (710) to the fabricated object (578). In one embodiment, the CAD software program is resident in another networked computer component operatively coupled to the main control unit (584). Accordingly, the two-dimensional and/or three-dimensional (3D) fabricated objects (578) are fabricated from a computer model in which, by software, the accurate deposition of the desired material is guided.

Referring to FIG. 1, in one embodiment, the control unit (584) regulates the individual constituents of the compositions (710) as the raw materials (108) are added and transported through the material handling portions of the nano-scale electrospray deposition system (100). In one embodiment, multiple material supply bins (108) and multiple raw materials transfer devices (130) are used to produce variations of the compositions (710). The concentrations of the nano-structural materials (808), the grain growth inhibitor nano-particles, the engineered solute materials, and the engineered nano-particle materials may be varied to ultimately provide any desired species of the molten compositions (710). One non-limiting example includes concentrations of a plurality of different nano-structural materials (808) mixed together to produce variations of the predetermined and configured nano-structural materials mixtures to facilitate forming variations of the predetermined and configurable molten compositions (710) and subsequent graduated nano-structures on the fabricated objects (578). Therefore, each of molten compositions (710) is a variation of a particular mixture, where the degree of the configurable variations is predetermined. In other embodiments, a plurality of nano-structural materials (808) with substantially different properties are mixed to form unique mixtures and unique molten compositions. Similarly, grain growth inhibitor nano-particles, engineered solute materials, and engineered nano-particle materials may be varied. In one embodiment, any other materials required to fabricate the nano-structures as described herein may be used and varied. In one embodiment, other aerospace materials, such as those listed in Tables 1 and 2 above, may be used and varied. In one embodiment, other materials that facilitate further downstream manufacturing may be used. Accordingly, the production of the molten compositions (710) as described herein provides for producing the compositions (710) throughout the spectrum of constituent concentrations necessary to produce the fabricated objects (578).

Additional Nano-Scale Electrospray Deposition Systems

Figure 15:
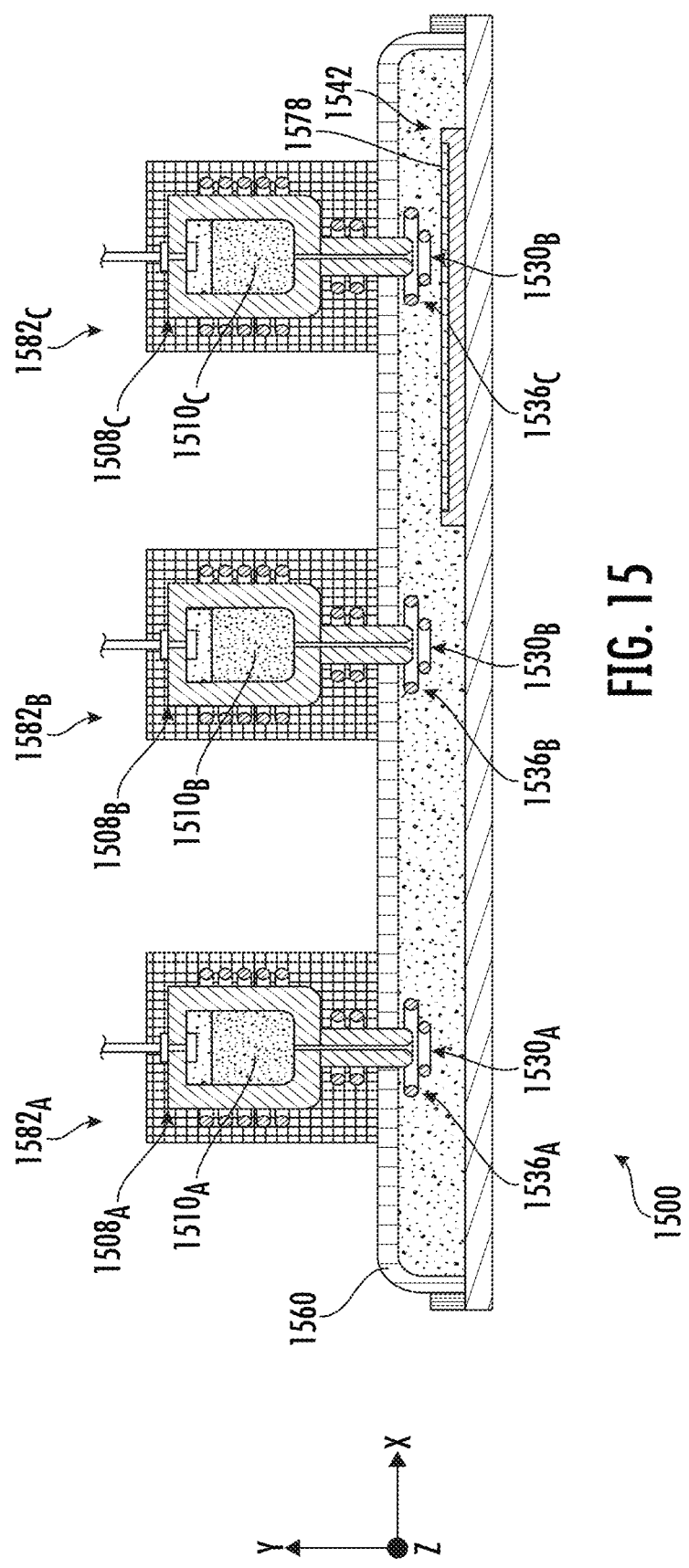
FIG. 15 depicts a sectional schematic view of another embodiment of a nano-scale electrospray deposition system.

Referring to FIG. 15, a sectional schematic view is provided illustrating another embodiment of a nano-scale electrospray deposition system (1500). As shown, three nano-scale electrospray deposition apparatus ($1582_A$), ($1582_B$), and ($1582_C$) are positioned in parallel or relatively parallel. Although three electrospray deposition apparatus is shown, this quantity is for illustrative purposes and should be considered as a non-limiting quantity. The first nano-scale electrospray deposition apparatus ($1582_A$) includes a first molten material reservoir ($1508_A$) that contains a first molten composition(s) ($1510_A$). The first nano-scale electrospray deposition apparatus ($1582_A$) also includes a first electrospray nozzle ($1530_A$) that penetrates an enclosure (1560) with a first extractor electrode ($1536_A$) operatively coupled to the first electrospray nozzle ($1530_A$). The first electrospray nozzle ($1530_A$) is generally oriented toward a fabricated object (1578) positioned on a stage (1542).

Similarly, a second and a third nano-scale electrospray deposition apparatus ($1582_B$) and ($1582_C$), respectively, includes a second and a third molten material reservoir ($1508_B$) and ($1508_C$), respectively) that contains a second and a third molten composition (or composition) ($1510_B$) and ($1510_C$), respectively. The second and third nano-scale electrospray deposition apparatus ($1582_B$) and ($1582_C$), respectively, also include a second and a third electrospray nozzle ($1530_B$) and ($1530_C$), respectively, that penetrate the enclosure (1560) with a second and a third extractor electrode ($1536_B$) and ($1536_C$), respectively, operatively coupled to the respective nozzles ($1530_B$) and ($1530_C$), respectively. The second and third electrospray nozzles ($1530_B$) and ($1530_C$) are oriented toward the fabricated object (1578)

positioned on the stage (1542). Accordingly, a fabrication system such as the nano-scale electrospray deposition system (1500) includes a plurality of nano-scale electrospray deposition apparatus (1582$_A$), (1582$_B$), and (1582$_C$) to efficiently produce the fabricated objects (1578). In one embodiment, rather than a plurality of extractor electrodes (1536$_A$), (1536$_B$), and (1536$_C$), one or more extractor electrode plates similar to the extractor electrode plate (736) are used.

Each nano-scale electrospray deposition apparatus (1582$_A$), (1582$_B$), and (1582$_C$) performs an electrospray deposition of monodispersed nano-droplets (not shown in FIG. 15) as described elsewhere herein. Each of the three molten compositions (1510$_A$), (1510$_B$), and (1510$_C$) are one of substantially similar, incremental variations of a particular composition, or different. The stage (1542) traverses through the enclosure (1560) as necessary to be positioned under the scheduled spray nozzle (1530$_A$), (1530$_B$), and (1530$_C$) such that the fabricated object (1578) receives the appropriate material composition (1510$_A$), (1510$_B$), and (1510$_C$), respectively, for constructing the predetermined and configured nano-structures thereon. One or more control units (584) control the operation of the nano-scale electrospray deposition system (1500) in a manner similar to that described elsewhere herein.

In operation, nano-scale electrospray deposition system (1500) produces the fabricated object (1578) through serially positioning the stage under the electrospray nozzles (1530$_A$), (1530$_B$), and (1530$_C$), where the three material compositions (1510$_A$), (1510$_B$), and (1510$_C$) are substantially similar, and the repositioning of the stage (1542) is contingent upon the exhaustion of the material composition (1510$_A$), (1510$_B$), and (1510$_C$), in the present molten material reservoir (1508$_A$), (1508$_B$), and (1508$_C$). A single stage (1542) is shown to transport the fabricated object (1578) with the proper orientation toward the respective nozzles (1530$_A$), (1530$_B$), and (1530$_C$). However, any number of stages (1542) that enables operation of nano-scale electrospray deposition system (1500) as described herein is used for those embodiments of the system (1500) arranged to mass produce multiple copies of the fabricated object (1578) substantially simultaneously and continuously. In some alternative embodiments, the nano-scale electrospray deposition apparatus (1582$_A$), (1582$_B$), and (1582$_C$) are arranged such that the three electrospray nozzles (1530$_A$), (1530$_B$) and (1530$_C$) are oriented to allow or enable simultaneous electrospraying of the same compositions (1510$_A$), (1510$_B$), and (1510$_C$) by more than one of the nozzles (1530$_A$), (1530$_B$), and (1530$_C$). Accordingly, the nano-scale electrospray deposition system (1500) is scalable to mass produce substantially similar fabricated objects (1578).

In one embodiment, in operation, the nano-scale electrospray deposition system (1500) is capable of producing the fabricated object (1578) through serially positioning the stage under the electrospray nozzles (1530$_A$), (1530$_B$), and (1530$_C$). The three material compositions (1510$_A$), (1510$_B$), and (1510$_C$) are different, and the repositioning of the stage (1542) is contingent upon the timed electrospraying of the material compositions (1510$_A$), (1510$_B$), and (1510$_C$) in a predetermined and configurable sequence with the scheduled positioning of the stage (1578) to produce the predetermined and configured nano-structures on the fabricated object (1578). Similarly, those variations of a particular material composition are also electrosprayed to produce the fabricated object (1578). In one embodiment, the nano-scale electrospray deposition apparatus (1582$_A$), (1582$_B$), and (1582$_C$) are arranged such that the three electrospray nozzles (1530$_A$), (1530$_B$), and (1530$_C$) are oriented to allow or enable simultaneous electrospraying of the different compositions (1510$_A$), (1510$_B$), and (1510$_C$) by more than one of the nozzles (1530$_A$), (1530$_B$), and (1530$_C$). Accordingly, the nano-scale electrospray deposition system (1500) is scalable to mass produce different fabricated objects (1578) to form one or more of the compositional gradients, gradient alloys, and graduated nano-structures described elsewhere herein.

Figure 16:
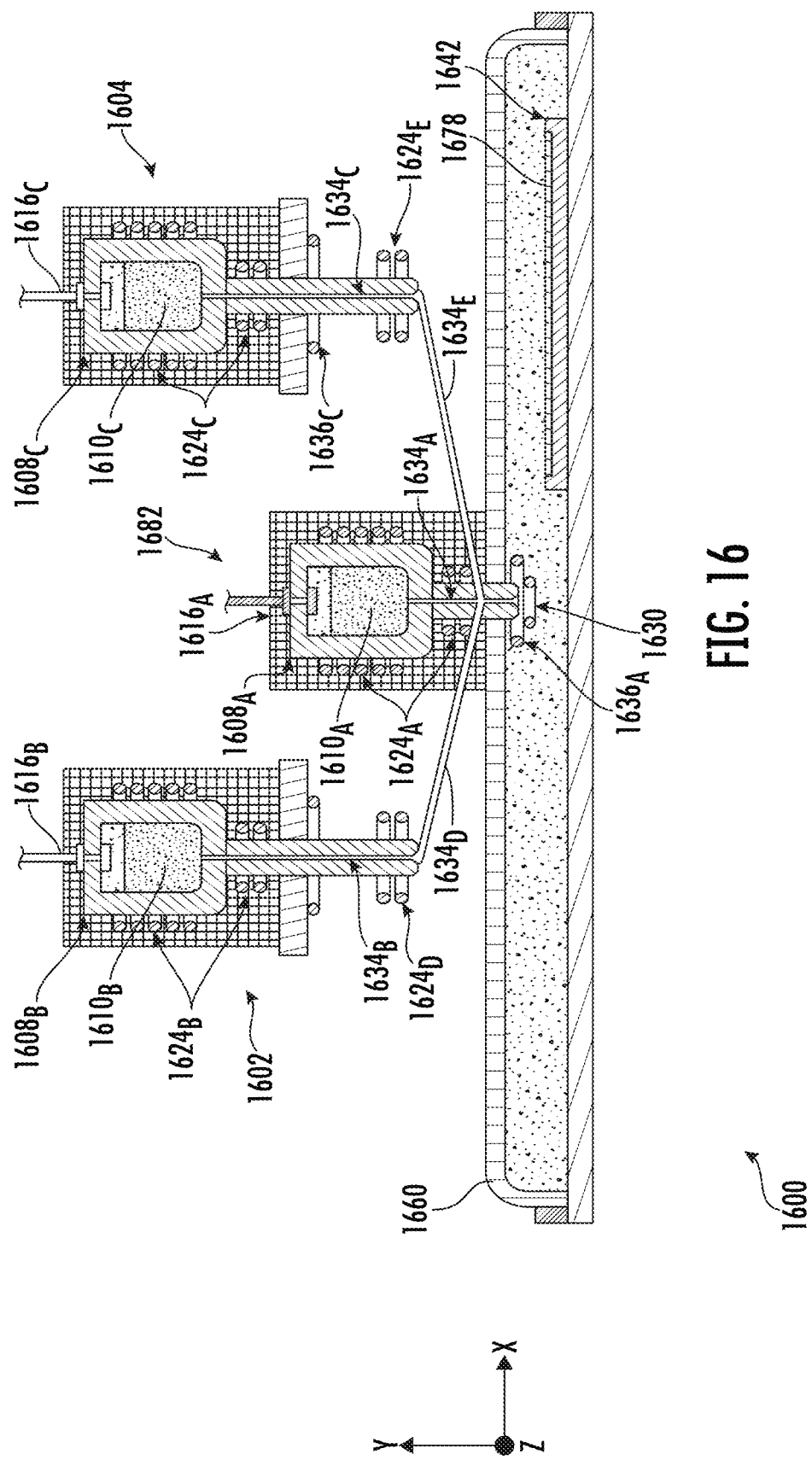
FIG. 16 depicts a sectional schematic view of yet another embodiment of a nano-scale electrospray deposition system.

Referring to FIG. 16, a sectional schematic view is provided illustrating yet another embodiment of a nano-scale electrospray deposition system (1600). One nano-scale electrospray deposition apparatus (1682) is shown, although one apparatus (1682) is a non-limiting value and in one embodiment there may be a plurality of apparatus (1682). The nano-scale electrospray deposition apparatus (1682) is shown with a first material reservoir (1608$_A$) that contains a first molten composition(s) (1610$_A$). The materials that comprise the composition (1610$_A$) in the reservoir (1608$_A$) are maintained in the molten state through a first plurality of induction heating coils (1624$_A$). Pressure in the first material reservoir (1610$_A$) is at least partially maintained with an inert gas input and regulating system (1616$_A$). The nano-scale electrospray deposition apparatus (1682) also includes an electrospray nozzle (1630) coupled in flow communication with a first capillary tube (1634$_A$) that penetrates an enclosure (1660) with a first extractor electrode (1636$_A$) operatively coupled to the nozzle (1630). The electrospray nozzle (1630) is generally oriented toward a fabricated object (1678) positioned on a stage (1642).

The nano-scale electrospray deposition system (1600) also includes a first additional engineered material injection system (1602) that supplies engineered materials toward the fabrication of the fabricated object (1678) that that were not added to the first molten composition (1610$_A$). The additional engineered materials include tailoring materials such as, and without limitation, grain growth inhibitor nano-particles (806), engineered solutes (810), and engineered nano-particles (812), and any combinations thereof. The additional engineered materials are either mixed into one of a homogeneous mixture or a heterogeneous mixture. In some embodiments, the additional engineered materials are layered. The first additional engineered material injection system (1602) includes a second material reservoir (1608$_B$) that contains first additional engineered material(s) (1610$_B$). In one embodiment, the material(s) (1610$_B$) may include a plurality of constituents that form a composition. Pressure in the second material reservoir (1610$_B$) is at least partially maintained with an inert gas input and regulating system (1616$_B$). The first injection system (1602) also includes a second plurality of induction heating coils (1624$_B$). The induction heating coils (1624$_B$) are available, but, may not always be necessary to maintain the additional engineered materials (1610$_B$) in a molten condition. The first additional engineered material injection system (1602) includes a second capillary tube (1634$_B$) and a conduit, i.e., a second capillary tube extension (1634$_D$) coupled in flow communication with the first capillary tube (1634$_A$). In some embodiments, the second capillary tube (1634$_B$) and the second capillary tube extension (1634$_D$) include fourth induction heating coil(s) (1624$_D$) (shown operatively coupled to the second capillary tube (1634$_B$)). Also, in some embodiments, the first additional engineered material injection system (1602) includes a second extractor electrode (1636$_B$) for those first additional engineered materials (1610$_B$) that require the associated electric field and/or magnetic field for extraction from the material reservoir ($1608_B$) and further transport to the first capillary tube ($1634_A$).

The nano-scale electrospray deposition system (1600) also includes a second additional engineered material injection system (1604) that supplies engineered materials toward the fabrication of the fabricated object (1678) that were not added to the first molten composition ($1610^A$). The inclusion of two injections systems (1602) and (1604) is non-limiting. The second additional engineered material injection system (1604) includes a third material reservoir ($1608_C$) that contains second additional engineered materials ($1610_C$). In one embodiment, the materials ($1610_C$) may include a plurality of constituents that form a composition. Pressure in the third material reservoir ($1610_C$) is at least partially maintained with an inert gas input and regulating system ($1616_C$). The second injection system (1604) also includes a third plurality of induction heating coils ($1624_C$). The induction heating coils ($1624_C$) are available, but may not always be necessary to maintain the additional engineered materials ($1610_C$) in a molten condition. The second additional engineered material injection system (1604) includes a third capillary tube ($1634_C$) and a conduit, i.e., a third capillary tube extension ($1634_E$) coupled in flow communication with the first capillary tube ($1634_A$). In one embodiment, the third capillary tube ($1634_C$) and the third capillary tube extension ($1634_E$) include fifth induction heating coils ($1624_E$) (shown operatively coupled to the third capillary tube ($1634_C$)). Also, in one embodiment, the second additional engineered material supply apparatus (1604) includes a third extractor electrode (1636C) for those first additional engineered materials ($1610_C$) that require the associated electric field and/or magnetic field for extraction from the material reservoir ($1608_C$) and further transport to the first capillary tube ($1634_A$). Accordingly, the nano-scale electrospray deposition system (1600) includes first and second additional engineered material injection systems (1602) and (1604), respectively to supplement the materials of the nano-scale electrospray deposition apparatus (1682) to produce the engineered (tailored) fabricated objects (1678).

In operation, control of the first and second additional engineered material injection systems (1602) and (1604), respectively, includes devices such as, and without limitation, main control unit (584) operatively coupled to field devices such as, and without limitation, regulating valves (374), second and third extractor electrodes ($1636_B$) and ($1636_C$), respectively, and inert gas input and regulating systems ($1616_B$) and ($1616_C$), respectively. Some circumstances for producing the fabricated object (1678) that require additional engineering materials ($1610_B$) and/or ($1610_C$) include, without limitation, chemical or other physical requirements for nano-materials that are not in a molten state to be added to the molten materials ($1610_A$) in the first capillary tube ($1624_A$) and temperature control of the molten materials ($1610_A$) in the first capillary tube ($1624_A$). Flows of the additional engineering materials ($1610_B$) and ($1610_C$) are regulated through the second and/or third capillary tube ($1634_B$) and the associated second and third capillary tube extensions ($1634_D$) and ($1634_E$), respectively, into the first capillary tube ($1634_A$). In some embodiments, the combination of the molten compositions ($1610_A$) and the first additional engineered materials ($1610_B$) and/or the second additional engineered materials ($1610_C$) produces the composition (or compositions) (not shown) that is/are used to form the deposition layers as described elsewhere herein. In those embodiments where the additional engineered materials are layered, the compositions of the materials being ejected through the electrospray nozzle (1630) will change from a first composition to a second composition as the layers are exhausted. In one embodiment, the first and second additional engineered material injection systems (1602) and (1604), respectively, are used with the nano-scale electrospray multi-nozzle deposition apparatus (700). Accordingly, the first and second additional engineered material injection systems (1602) and (1604), respectively, provide for an alternative method of tailoring the fabricated objects (1678) with engineered nano-structures to form one or more of the compositional gradients, gradient alloys, and graduated nano-structures described elsewhere herein.

Figure 17:
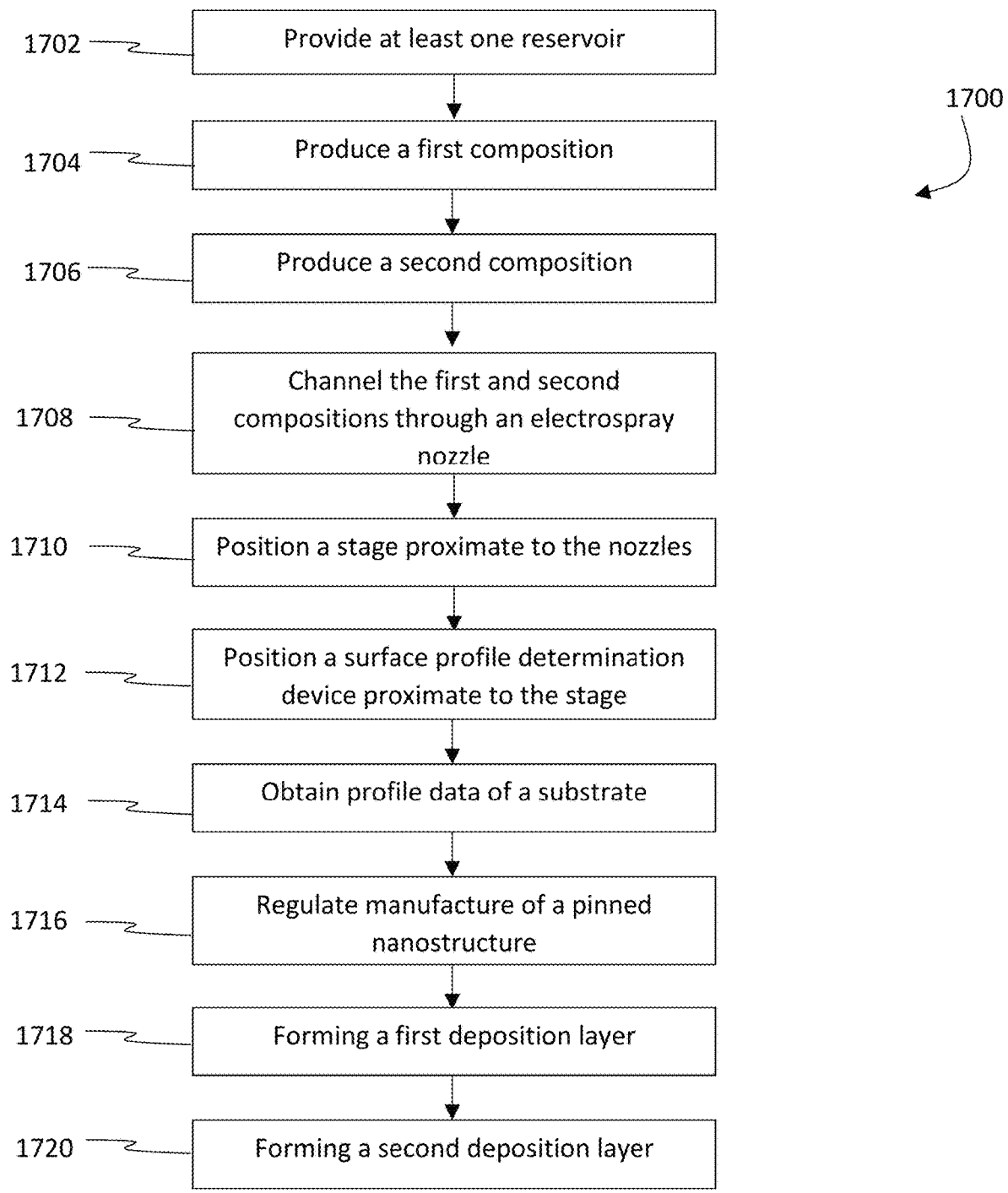
FIG. 17 depicts a flow chart illustrating a process for fabricating an object with nano-structures thereon.

Referring to FIG. 17, a flow chart (1700) is provided illustrating a process for fabricating an object with nano-structures thereon. As shown and described in FIG. 17, at least one reservoir (208), (708), ($1508_A$), ($1508_B$), and ($1508_C$) is provided (1702) to hold at least one composition (210), (710), ($1510_A$), ($1510_B$), ($1510_C$), respectively. In some embodiments, a plurality of reservoirs ($1508_A$), ($1508_B$), and ($1508_C$) are provided to hold either similar compositions or different compositions to enable deposition of the compositions (210), (710), ($1510_A$), ($1510_B$), ($1510_C$) with increased efficiency over that of a single-nozzle apparatus, e.g., apparatus 200, 400, and 500 (shown in FIGS. 2, 4, and 5, respectively). A first composition (712) and ($1510_A$) is produced (1704) through combining a first nano-structural material (808), a plurality of first grain growth inhibitor nano-particles (806) including one or more first grain growth inhibitors (not shown). The first composition (712) and ($1510_A$) also includes at least one of a first engineered solute (810) including one or more first engineered solute materials (not shown), and a plurality of first engineered nano-particles (812) including one or more first engineered nano-particle materials (not shown).

A second composition (714) and ($1510_B$) is produced (1706) through combining a second nano-structural material (808), a plurality of second grain growth inhibitor nano-particles (806) including one or more second grain growth inhibitors (not shown). The second composition (714) and ($1510_B$) also includes at least one of a second engineered solute (810) including one or more second engineered solute material (not shown), and a plurality of second engineered particles (812) comprising one or more second engineered nano-particle materials (not shown). The first and second compositions (712) and ($1510_A$) and (714) and ($1510_B$), respectively, are channeled (1708) through one or more electrospray nozzles (230), (730), ($1530_A$), ($1530_B$), and ($1530_C$) operatively coupled to the at least one reservoir (208), (708), ($1508_A$), ($1508_B$), and ($1508_C$). A stage (242) and (1542) is positioned (1710) proximate to the nozzles (230), (730), ($1530_A$), ($1530_B$), and ($1530_C$), where the stage (242) and (1542) is adapted to move relative to the nozzles (230), (730), ($1530_A$), ($1530_B$), and ($1530_C$). The stage (242) and (1542) includes a substrate holder (254) adapted to hold a substrate (912). A surface profile determination device (582) and (588) is positioned (1712) proximate to the stage (242) and (1542), where the device (582) and (588) obtains (1714) profile data of the substrate (912). A control unit (584) operatively coupled to the device (582) and (588) and the stage (242) and (1542) regulates (1716) manufacture of a pinned nano-structure (900) forming (1718) a first deposition layer (1006) with the first composition (712) proximal to the substrate (912), and forming (1720) a second deposition layer (1008) with the second composition (714) proximal to the substrate (912).

As described herein, the present disclosure is directed generally to apparatus and methods of forming nano-structures with tailored properties on objects while fabricating the objects. Specific compositions are mixed to produce specific features and properties on the fabricated objects. The compositions include one or more nano-structural materials (in the form of nano-particles) to produce the fundamental structural properties of the nano-structures that are formed as described herein. Grain growth inhibitor nano-particles are included in the compositions to restrict growth of the grain boundaries of the materials through pinning as they are deposited on the substrate of a material. In addition, the compositions also include an engineered solute and/or engineered nano-particles and one or more binding/wetting agents.

The compositions are electrosprayed as a plurality of molten nano-droplets where the composition, size, temperature, uniformity, rate of deposition, and precision of deposition of the nano-droplets is controlled. In addition, the sequence of depositing the different layers of nano-droplets is controlled. The electrospray production of molten droplets of a controllable composition and selectable temperature enable an almost voidless final product to be fabricated with desired properties. The tailoring of properties enables the direct printing of gradient alloys, where embedded work-hardening effects are an intrinsic result of the process, and predetermined hardness values are attributed to the nano-grain composition. Current compositions of existing alloys, such as aluminum 6061 T6, can have improved properties simply by fabrication through the electrospray processes disclosed herein. The direct printing of the nano-structured materials provides for fabricating new materials that cannot be formed by natural processes due to the lack of process parameter control and the lack of the unique constituents needed to obtain the desired properties in the final composition.

The nano-scale electrospray deposition systems and apparatus described herein facilitate creating a combined covalent-metallic-ionic type of chemical bonds in the electrosprayed depositions, thereby eliminating the need for sintering. The apparatus as described herein provides for the direct and precise formation of a free-form two-dimensional and three-dimensional (3D) article without the need for a mold of the article. In addition, the apparatus described herein provides a means for the constant variation of the compositions within the molten materials. Pinning the grain boundaries and varying the compositions of the deposited layers allows or enables creating unique, tailored properties of the nano-structures to form one or more of the compositional gradients, gradient alloys, and graduated nano-structures described elsewhere herein. The nano-scale electrospray deposition systems and apparatus described herein are scalable to provide for producing individual objects with predetermined and configurable properties for unique and specialized service and to mass produce nano-scale-sized devices for general commercial consumption.

Aspects of the present embodiments are described herein with reference to one or more of flowchart illustrations and/or block diagrams of methods and apparatus (systems) according to the embodiments.

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles of the embodiments and the practical application, and to enable others of ordinary skill in the art to understand the embodiments for various embodiments with various modifications as are suited to the particular use contemplated. The implementation of the nano-scale fabrication systems and apparatus described herein facilitates fabrication of objects across a wide spectrum of uses. Accordingly, the nano-scale fabrication systems and apparatus and the associated embodiments as shown and described in FIGS. 1-17, provide for creating unique, tailored properties of the nano-structures to form one or more of the compositional gradients, gradient alloys, and graduated nano-structures.

It will be appreciated that, although specific embodiments have been described herein for purposes of illustration, various modifications may be made without departing from the spirit and scope of the embodiments. In particular, the nano-scale fabrication systems and apparatus are shown as configured to produce unique two-dimensional and three-dimensional (3D) objects on a nano-scale frame of reference. Alternatively, the nano-scale fabrication systems and apparatus may be configured to produce product along the size spectrum from nano-scale, such as electrodes for nano-scale energy conversion devices, micro-devices and micro-tools for virtually any industry, through the macroscopic scale that includes devices and tools that are easily discernable with the unaided eye. Accordingly, the scope of protection of the embodiment(s) is limited only by the following claims and their equivalents.

What is claimed is:
1. A method comprising:
providing a first composition, the first composition including:
a first nano-structural material;
a plurality of first grain growth inhibitor nano-particles including one or more first grain growth inhibitors; and
at least one of:
a first tailoring solute including one or more first tailoring solute materials; and/or
a plurality of first tailoring nano-particles including one or more first tailoring nano-particle materials; and
providing a second composition, the second composition including:
a second nano-structural material;
a plurality of second grain growth inhibitor nano-particles including one or more second grain growth inhibitors; and
at least one of:
a second tailoring solute including one or more second tailoring solute materials; and/or a plurality of second tailoring particles including one or more second tailoring nano-particle materials; and manufacturing a pinned nano-structure with one or more tailored gradient properties comprising:
forming a first deposition layer with the first composition, the first layer positioned proximal to an object holder; and
forming a second deposition layer with the second composition positioned proximal to the object holder.

2. The method of claim 1, further comprising fabricating the pinned nano-structure to include a graduated nano-structure, wherein the graduated nano-structure comprises the first deposition layer, the second deposition layer, or a combination thereof.

3. The method of claim 2, wherein fabricating the graduated nano-structure comprises fabricating one or more gradient alloys, wherein the one or more gradient alloys includes a material composition that varies with respect to at least one physical dimension.

4. The method of claim 3, wherein fabricating the graduated nano-structure further comprises:
modulating one or more of a concentration of the first nano-structural material, a concentration of the first grain growth inhibitor nano-particles, a concentration of the first tailoring solute materials, and/or a concentration of the first tailoring nano-particle materials.

5. The method of claim 4, wherein fabricating the graduated nano-structure further comprises:
forming the first nano-structural material comprising mixing at least a third nano-structural material and a fourth nano-structural material, wherein the third nano-structural material is different from the fourth nano-structural material; and
modulating concentrations of the third and fourth nano-structural materials.

6. The method of claim 5, wherein fabricating the graduated nano-structure further comprises:
modulating one or more of a concentration of the second nano-structural material, a concentration of the second grain growth inhibitor nano-particles, a concentration of the second tailoring solute materials, and/or a concentration of the second tailoring nano-particle materials.

7. The method of claim 6, wherein:
the second nano-structural material includes at least fifth and sixth nano-structural materials, wherein the fifth nano-structural material is different from the sixth nano-structural material; and
fabricating the graduated nano-structure further comprises modulating concentrations of the fifth and sixth nano-structural materials.

8. The method of claim 1, further comprising forming a homogeneous conjoined deposition layer with the first and second deposition layers, wherein the first composition is homogeneous and the second composition is homogeneous.

9. The method of claim 1, further comprising forming a graduated conjoined deposition layer with the first and second deposition layers, wherein the first composition is homogeneous and the second composition is homogeneous.

10. The method of claim 1, further comprising:
generating, proximate at least one nozzle, an electric field and/or a magnetic field;
extracting the first composition through the at least one nozzle and directing the first composition toward the object holder through the electric field and/or the magnetic field, thereby forming first mono-dispersed droplets and forming the first deposition layer; and
extracting the second composition through the at least one nozzle and directing the second composition toward the object holder through the electric field and/or the electric field, thereby forming second mono-dispersed droplets and forming the second deposition layer.

11. The method of claim 10, further comprising configuring the electric field to drive the first and second mono-dispersed droplets toward the object holder.

12. The method of claim 10, further comprising configuring the magnetic field to limit dispersion of the first and second mono-dispersed droplets from the at least one nozzle toward the object holder.

13. The method of claim 10, further comprising regulating movement of the object holder with respect to the at least one nozzle to maintain a target stand-off distance between the at least one nozzle and the first and second deposition layers on the object holder.

14. The method of claim 13, further comprising calculating the target stand-off distance based on profile data of the first and second deposition layers.

15. The method of claim 10, wherein the at least one nozzle comprises a first nozzle and a second nozzle, and wherein the method further comprises:
storing the first composition in a first reservoir adaptively coupled to the first nozzle; and
storing the second composition in a second reservoir adaptively coupled to the second nozzle.

16. The method of claim 15, further comprising:
selectively aligning the object holder with the first nozzle;
depositing the first composition on the object holder responsive to the selective alignment;
selectively aligning the object holder with the second nozzle; and
depositing the second composition on the object holder responsive to the selective alignment.

17. The method of claim 16, wherein depositing the first and second compositions comprises creating a compositional gradient.

18. The method of claim 10, further comprising:
controlling movement of the stage, the movement to align the object holder with the at least one nozzle;
extracting the first composition through the at least one nozzle until the first composition is exhausted from a reservoir; and
sequentially extracting the second composition through the at least one nozzle and delivering the second composition to the object holder, thereby forming a compositional gradient through the sequential extraction.

19. The method of claim 10, further comprising:
storing the first nano-structural material in a reservoir; and
coupling an injection system to a conduit extending between the reservoir and the at least one nozzle.

20. The method of claim 19, further comprising forming the first composition comprising:
regulating a first injection of the first grain growth inhibitor nano-particles and the at least one of the first tailoring solute and/or the first tailoring nano-particles into the first nano-structural material.

21. The method of claim 19, further comprising forming the second composition comprising:
storing the second nano-structural material in the reservoir, wherein the first nano-structural material and the second nano-structural material are layered in the reservoir.

22. The method of claim 10, further comprising:
generating the first and second mono-dispersed droplets having a substantially uniform nano-particle size through modulating at least one electrical characteristic transmitted to form the electric field and/or the magnetic field, the electrical characteristic comprising voltage, current, frequency, and/or waveform.

23. The method of claim 10, wherein the forming the first deposition layer comprises modulating the first composition, and wherein the forming the second deposition layer comprises modulating the second composition.

24. The method of claim 10, further comprising:
maintaining the at least one nozzle at a predetermined electrical potential;
emitting a jet of the first or second composition through an exit port of the at least one nozzle;
transforming the jet of the first or second composition into a stream of droplets, the transforming comprising subjecting the jet to an electrical sheer stress generated by an extractor electrode, wherein each droplet has an electrical charge; and
controlling a size of each droplet through:
modulating an electrical characteristic of electric power transmitted to the extractor electrode, the electrical characteristic comprising voltage, current, frequency, and/or waveform; and/or
modulating a flow rate of the stream of droplets and a composition of the stream of droplets.

25. The method of claim 10, further comprising:
fabricating the at least one nozzle from a conductive material; and
at least partially coating the conductive material with an insulating material.

26. The method of claim 10, further comprising:
fabricating the at least one nozzle from a dielectric material; and
at least partially coating the dielectric material with a conductive material.

27. The method of claim 1, wherein providing a first composition further comprises:
adding a first binding agent to the first composition.

28. The method of claim 1, wherein providing a second composition further comprises:
adding a second binding agent to the second composition.

29. The method of claim 1, further comprising:
forming the first nano-structural material comprising mixing a plurality of first nano-structural material nano-particles; and
forming the second nano-structural material comprising mixing a plurality of second nano-structural material nano-particles.

30. The method of claim 1, wherein depositing first and second deposition layers on the object holder comprises:
creating an object configuration having one or more object configuration characteristics.

31. The method of claim 1, wherein the manufacturing a pinned nano-structure comprises extracting the first composition and the second composition through at least one nozzle, the method further comprising:
operatively coupling a manifold to the at least one nozzle;
operatively coupling a plurality of secondary nozzles to the manifold; and
orienting the plurality of secondary nozzles with an arcuate orientation extending about a lateral plane defined by a surface of the object holder.

32. The method of claim 31, further comprising:
fabricating each secondary nozzle from a conductive material; and
at least partially coating the conductive material with an insulating material.

33. The method of claim 31, further comprising:
fabricating each secondary nozzle from a dielectric material; and
at least partially coating the dielectric material with a conductive material.

34. The method of claim 1, further comprising:
forming the first nano-structural material, the forming of the first nano-structural material comprising blending two or more first nano-structural materials; and
forming the second nano-structural material, the forming of the second nano-structural material comprising blending two or more second nano-structural materials.

35. The method of claim 1, wherein further comprising:
forming the plurality of first grain growth inhibitor nano-particles, the forming of the plurality of first grain growth inhibit nano-particles comprising blending two or more of the first grain growth inhibitors; and
forming the plurality of second grain growth inhibitor nano-particles, the forming of the plurality of second grain growth inhibit nano-particles comprising blending two or more of the second grain growth inhibitors.

36. The method of claim 1, wherein:
the one or more tailored gradient properties comprise one or more first tailored properties and one or more second tailored properties;
the forming the first deposition layer with the first composition comprises at least partially tailoring the first deposition layer with the one or more first tailored properties through the one or more first tailoring solute materials; and
the forming the second deposition layer with the second composition comprises at least partially tailoring the second deposition layer with the one or more second tailored properties through the one or more second tailoring solute materials.

37. The method of claim 1, wherein:
the one or more tailored gradient properties comprise one or more first tailored properties and one or more second tailored properties;
the forming the first deposition layer with the first composition comprises at least partially tailoring the first deposition layer with the one or more first tailored properties through the one or more first tailoring nano-particle materials; and
the forming the second deposition layer with the second composition comprises at least partially tailoring the second deposition layer with the one or more second tailored properties through the one or more second tailoring nano-particle materials.

38. The method of claim 37, further comprising:
determining the one or more tailored gradient properties of one or more of the first and second deposition layers.

* * * * *

UNITED STATES PATENT AND TRADEMARK OFFICE
CERTIFICATE OF CORRECTION

PATENT NO. : 11,124,864 B2  
APPLICATION NO. : 16/416869  
DATED : September 21, 2021  
INVENTOR(S) : Joseph G. Birmingham Page 1 of 1

It is certified that error appears in the above-identified patent and that said Letters Patent is hereby corrected as shown below:

In the Claims

Claim 10, (Column 38, Line 6), change "electric" to "magnetic".

Claim 35, (Column 40, Line 21), delete "wherein".

Signed and Sealed this  
Twenty-second Day of February, 2022

Drew Hirshfeld  
*Performing the Functions and Duties of the*  
*Under Secretary of Commerce for Intellectual Property and*  
*Director of the United States Patent and Trademark Office*